US012406817B2

(12) United States Patent
Hsieh et al.

(10) Patent No.: US 12,406,817 B2
(45) Date of Patent: Sep. 2, 2025

(54) KEYSWITCH STRUCTURE

(71) Applicant: DARFON ELECTRONICS CORP., Taoyuan (TW)

(72) Inventors: Yu-Chun Hsieh, Taoyuan (TW); Ling-Hsi Chao, Taoyuan (TW); Shao-Lun Hsiao, Taoyuan (TW); Chen Yang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 265 days.

(21) Appl. No.: 18/223,527

(22) Filed: Jul. 18, 2023

(65) Prior Publication Data

US 2024/0105401 A1 Mar. 28, 2024

Related U.S. Application Data

(60) Provisional application No. 63/410,638, filed on Sep. 28, 2022.

(30) Foreign Application Priority Data

Jun. 15, 2023 (TW) ................................ 112122431

(51) Int. Cl.
*H01H 13/14* (2006.01)
*H01H 13/04* (2006.01)
*H01H 13/20* (2006.01)

(52) U.S. Cl.
CPC ............ *H01H 13/14* (2013.01); *H01H 13/04* (2013.01); *H01H 13/20* (2013.01)

(58) Field of Classification Search
CPC ........ H01H 13/14; H01H 13/04; H01H 13/20; H01H 3/46; H01H 2013/525; H01H 2237/002; H01H 13/28; H01H 13/36; H01H 3/125; H01H 13/70; H01H 13/7065
See application file for complete search history.

(56) References Cited

U.S. PATENT DOCUMENTS

| | | | | |
|---|---|---|---|---|
| 8,134,095 | B2 * | 3/2012 | Kiyono | H01H 5/14 200/417 |
| 10,930,451 | B2 * | 2/2021 | Wang | H01H 13/85 |
| 11,604,518 | B2 * | 3/2023 | Yang | H01H 13/7065 |
| 2021/0257168 | A1 | 8/2021 | Huang | |

FOREIGN PATENT DOCUMENTS

| | | |
|---|---|---|
| TW | 201501155 A | 1/2015 |

* cited by examiner

*Primary Examiner* — Lheiren Mae A Caroc
(74) *Attorney, Agent, or Firm* — Winston Hsu

(57) ABSTRACT

A keyswitch structure includes a casing, a first support, a second support, and a pressing stem. The casing forms an accommodating space and an opening communicating with the accommodating space. The first and second supports are disposed in the accommodating space and are directly and rotatably connected with the casing; the supports are also pivotally connected with each other. The pressing stem extends into the accommodating space to be rotatably connected with the first and second supports and protrudes from the casing through the opening. The pressing stem is movable parallel to a vertical direction relative to the casing through the first and second supports. A motion of the pressing stem in the vertical direction has a top dead center and a bottom dead center. When the pressing stem is at the top dead center and the bottom dead center, it does not touch the casing in the vertical direction.

6 Claims, 24 Drawing Sheets

KEYSWITCH STRUCTURE

CROSS REFERENCE TO RELATED APPLICATIONS

This application claims the benefit of U.S. Provisional Application No. 63/410,638, filed on Sep. 28, 2022. The content of the application is incorporated herein by reference.

BACKGROUND OF THE INVENTION

1. Field of the Invention

The present invention relates to a mechanical key.

2. Description of the Prior Art

A mechanical key usually includes multiple movable components. When a user presses the key, these movable components will move relative to each other and may collide with each other, producing sound. For example, in general, the upper and lower dead centers of the up and down reciprocating motion of the pressing stem of the key are realized by the casing of the key blocking the up and down motion of the pressing stem; that is, the pressing stem will hit the casing. The pressing stem hitting the casing produces sound. The harder the user presses on the pressing stem, the louder the pressing stem hits the casing. This phenomenon makes mechanical keys difficult to be used as keys for silent keyboards.

SUMMARY OF THE INVENTION

An objective of the invention is to provide a keyswitch structure, which uses a linkage mechanism to control the locations of the upper and bottom dead centers of the up and down reciprocating motion, which can effectively avoid the hit between components, thereby reducing the sound produced when the keyswitch structure is operated.

A keyswitch structure of an embodiment according to the invention includes a casing, a first support, a second support, and a pressing stem. The casing forms an accommodating space and has an opening communicating with the accommodating space. The first support is disposed in the accommodating space and is directly and rotatably connected with the casing. The second support is disposed in the accommodating space and is directly and rotatably connected with the casing. The first support and the second support are pivotally connected with each other. The pressing stem extends into the accommodating space to be rotatably connected with the first support and the second support and protrudes from the casing through the opening. The pressing stem is movable parallel to a vertical direction relative to the casing through the first support and the second support. A motion of the pressing stem in the vertical direction has a top dead center and a bottom dead center. Therein, when the pressing stem is at the top dead center and the bottom dead center, the pressing stem does not touch the casing in the vertical direction. Thereby, since the pressing stem will not hit the casing, sound produced by hitting the casing can be avoided, which is conducive to silent designs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
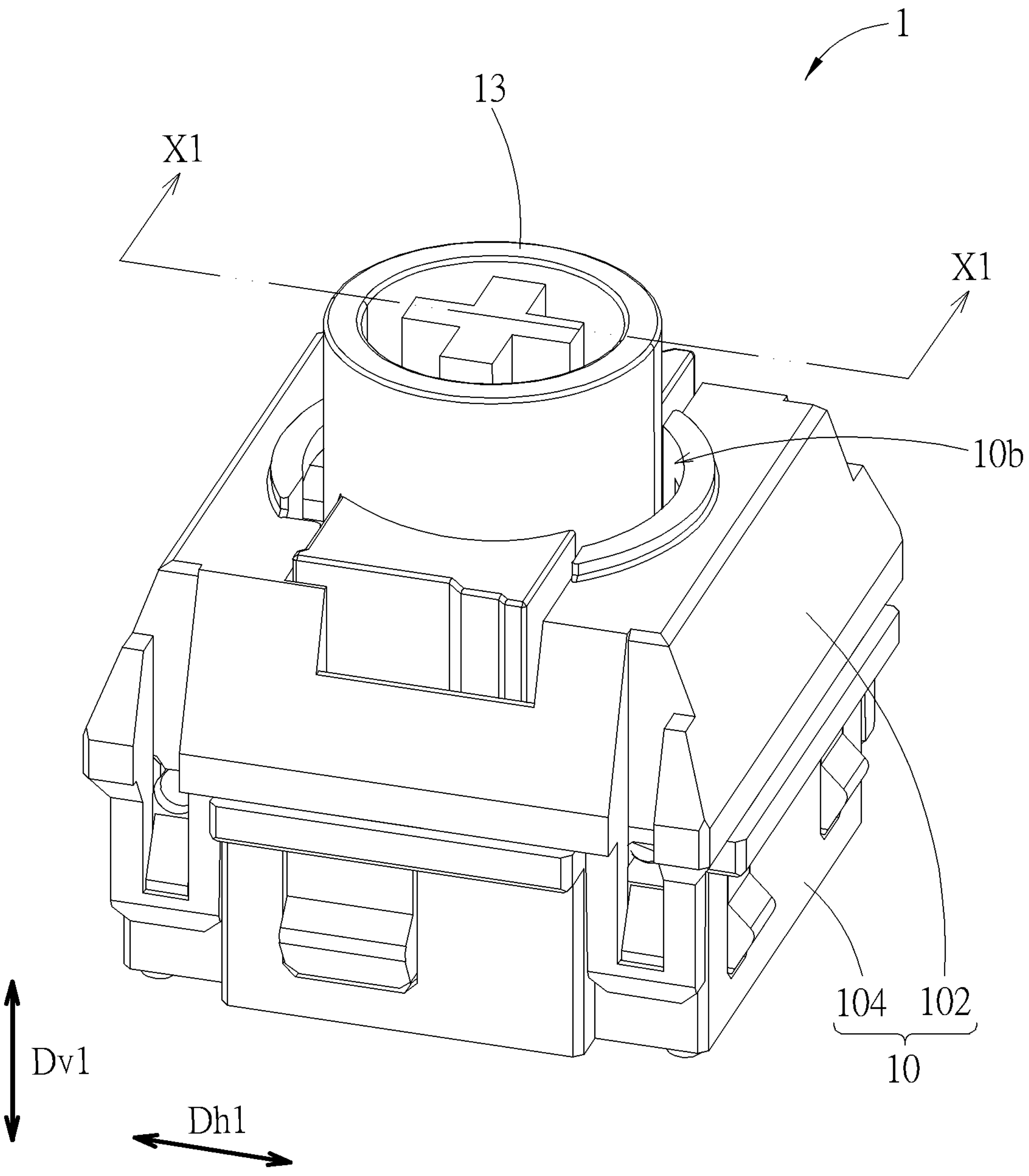
FIG. 1 is a schematic diagram illustrating a keyswitch structure according to a first embodiment.
Figure 2:
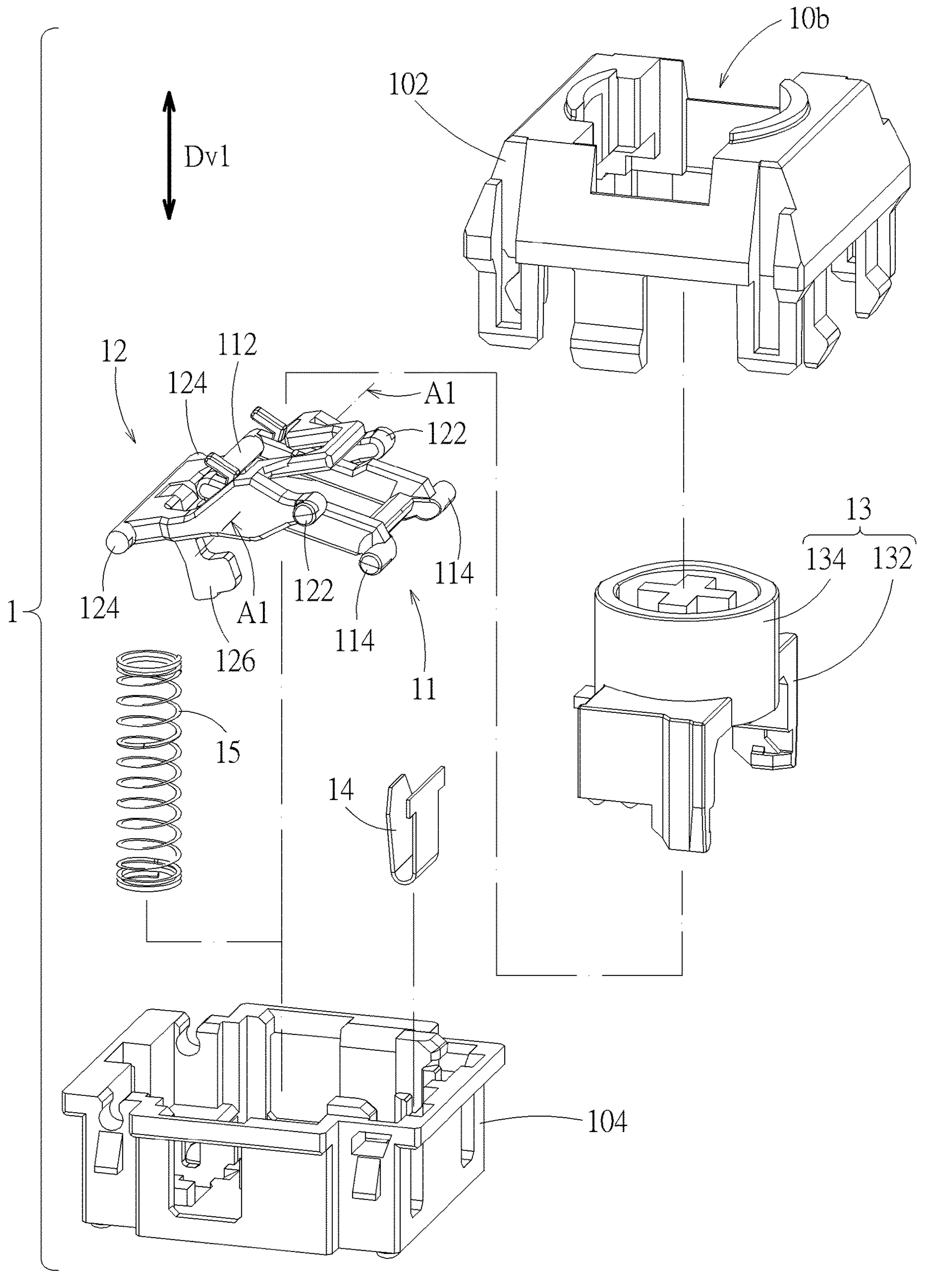
FIG. 2 is an exploded view of the keyswitch structure in FIG. 1.
Figure 3:
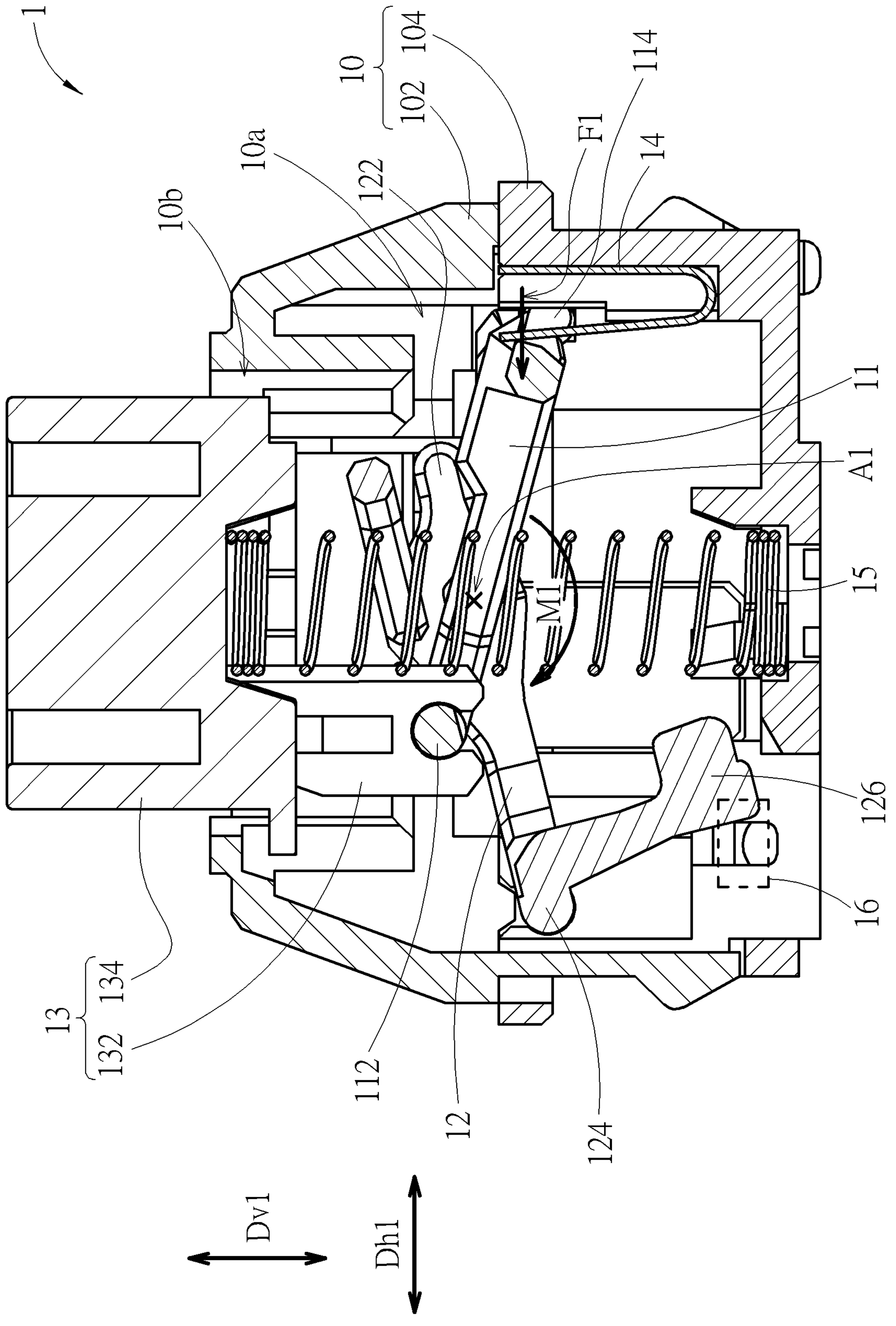
FIG. 3 is a sectional view of the keyswitch structure in FIG. 1 along the line X1-X1.

Please refer to FIG. 1 to FIG. 3. A keyswitch structure 1 according to a first embodiment includes a casing 10, a first support 11, a second support 12, a pressing stem 13, a lateral force generating mechanism 14, and a spring 15. The casing 10 includes an upper cover 102 and a lower cover 104. The upper cover 102 and the lower cover 104 are engaged to form an accommodating space 10*a*. The upper cover 102 has an opening 10*b* communicating with the accommodating space 10*a*. The first support 11 and the second support 12 are disposed in the accommodating space 10_a_ and are pivotally connected with each other relative to a rotation axis A1 (in FIG. 2, indicated by a chain line; in FIG. 3, indicated by a cross mark). The pressing stem 13 extends into the accommodating space 10_a_ to be rotatably connected with the first support 11 and the second support 12, and protrudes from the casing 10 through the opening 10_b_. Both the first support 11 and the second support 12 are directly and rotatably connected to the casing 10 and the pressing stem 13. Therein, the first support 11 has a pressing stem connecting portion 112 and is pivotally connected with the pressing stem 13 through the pressing stem connecting portion 112. The first support 11 also has a casing connecting portion 114 and is slidably and rotatably connected with the casing 10 (or a sliding slot formed on the lower cover 104) through the casing connecting portion 114. The second support 12 has a pressing stem connecting portion 122 and is slidably and rotatably connected with the pressing stem 13 (or a sliding slot formed on the upper cover 102) through the pressing stem connecting portion 122. The second support 12 also has a casing connecting portion 124 and is pivotally connected with the casing 10 (or the lower cover 104 thereof) through the casing connecting portion 124. The pressing stem 13 is movable parallel to a vertical direction Dv1 (indicated by a double-headed arrow in the figures) relative to the casing 10 through the first support 11 and the second support 12 (i.e., the pressing stem 13 can move up and down).

Furthermore, the lateral force generating mechanism 14 is disposed in the accommodating space 10_a_ and can apply a lateral force F1 to the first support 11. The lateral force F1 is not parallel to the vertical direction Dv1. In the first embodiment, the lateral force F1 is substantially parallel to a horizontal direction Dh1 (indicated by a double-headed arrow in the figures), i.e., perpendicular to the vertical direction Dv1. The lateral force F1 pushes the first support 11 (or the casing connecting portion 114 or a portion of the first support 11 close to the casing connecting portion 114) to make the pressing stem 13 tend to move upward or downward (as described below). The spring 15 is pre-compressed and disposed in the accommodating space 10_a_. The spring 15 abuts against and between the casing 10 (or the lower cover 104 thereof) and the pressing stem 13 in the vertical direction Dv1. When the pressing stem 13 is pressed (e.g., in practice, a keycap is fixedly connected to the pressing stem 13, and a user can press the pressing stem 13 by pressing the keycap), the pressing stem 13 moves downward parallel to the vertical direction Dv1 through the first support 11 and the second support 12 and squeezes the spring 15. The resilient force (of which the direction is upward) produced by the squeezed spring 15 (i.e., the elastically deformed spring 15) can exert an upward force on the pressing stem 13, so that the spring 15 tends to move upward in the vertical direction Dv1.

In the first embodiment, the lateral force generating mechanism 14 may be a bent elastic sheet, which is fixed on the lower cover 104. In practice, the bent elastic sheet can be replaced with other elastic parts, such as a spiral spring that is disposed horizontally and can also provide the first support 11 a horizontal lateral force. Furthermore, in the first embodiment, the spring 15 is realized by a spiral spring.

Figure 4:
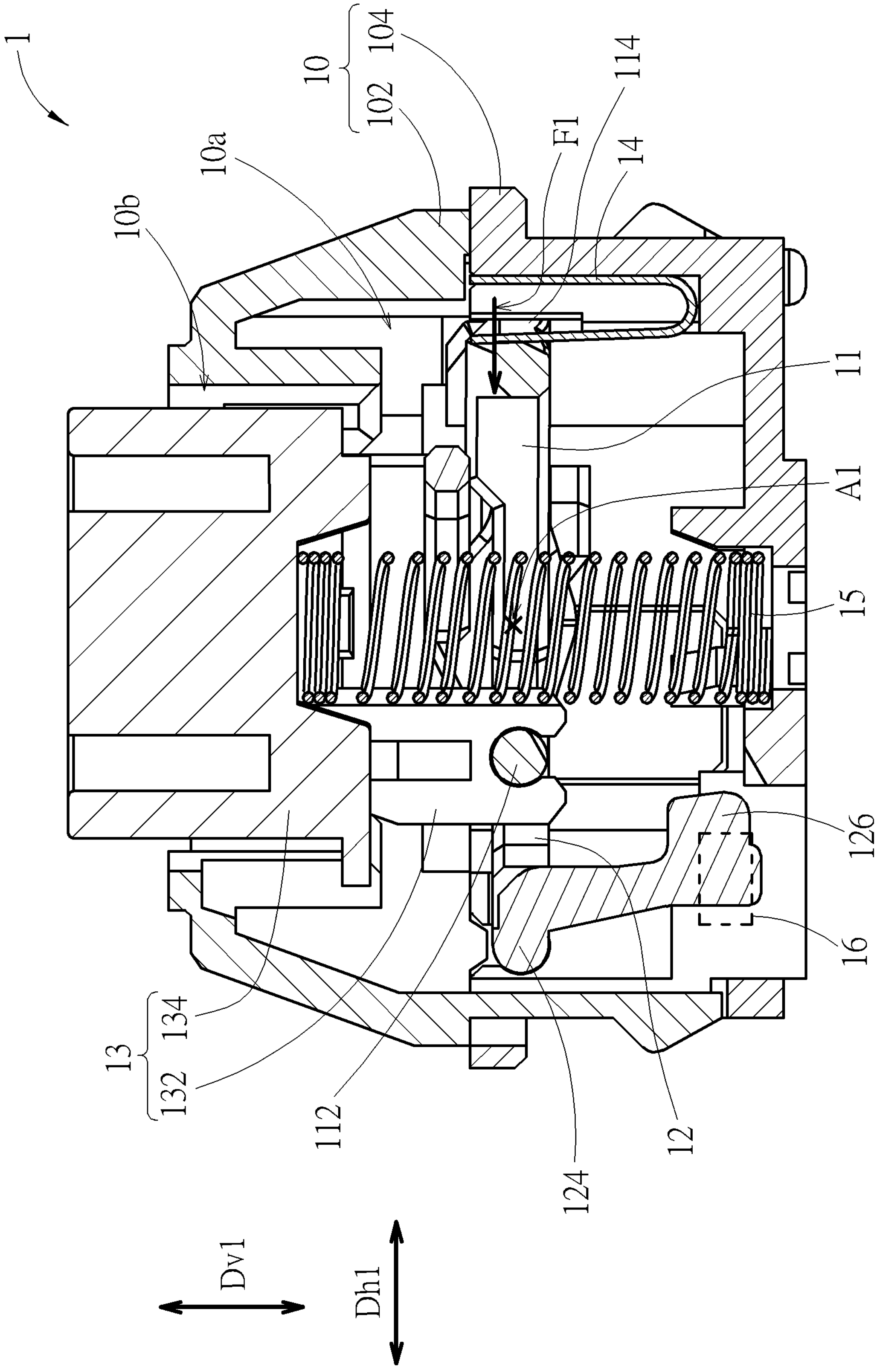
FIG. 4 is a sectional view of the keyswitch structure in FIG. 3 when the pressing stem of the keyswitch structure is at an intermediate position.
Figure 5:
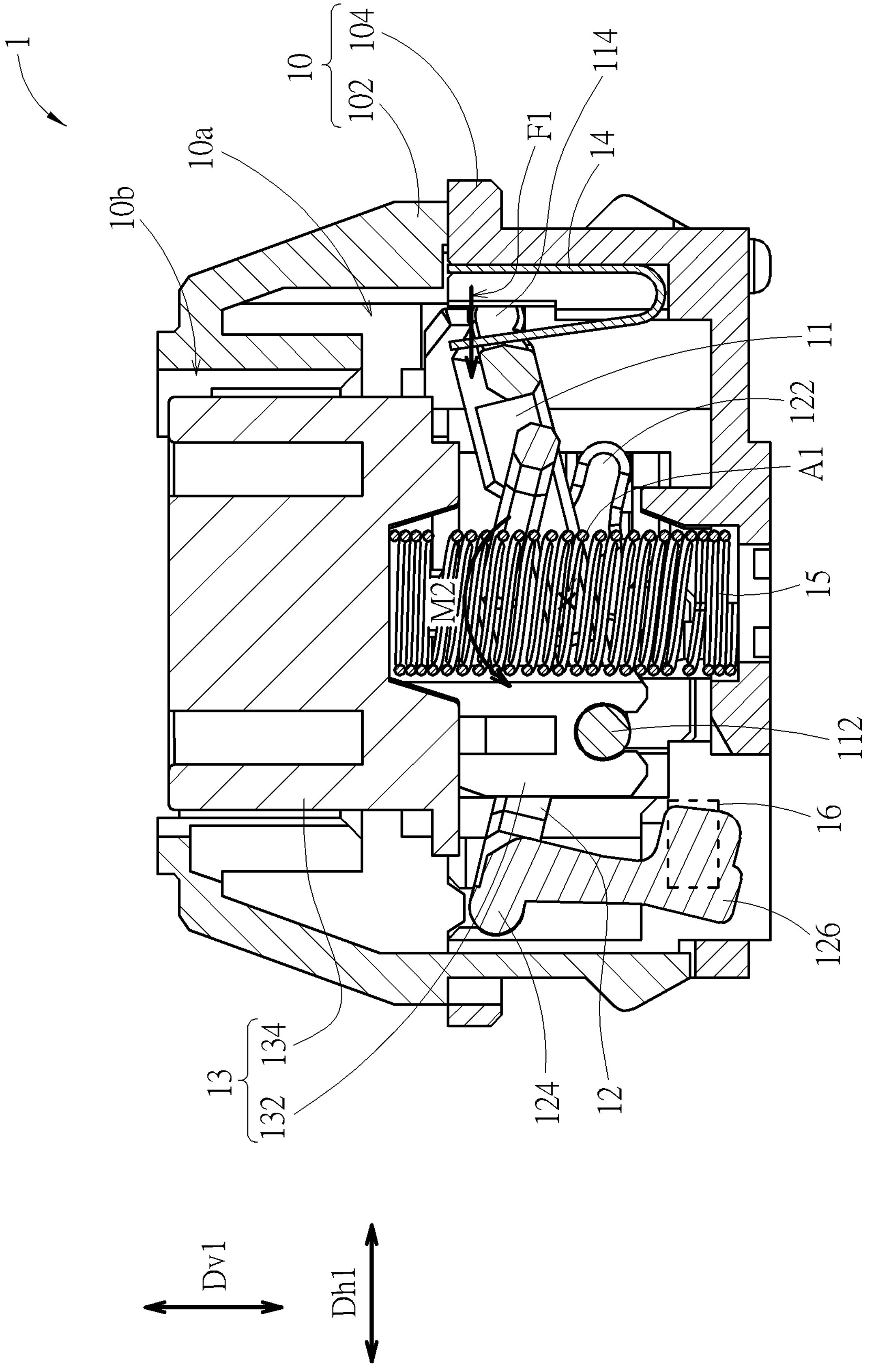
FIG. 5 is a sectional view of the keyswitch structure in FIG. 3 when the pressing stem is at a bottom dead center.

In the first embodiment, both the lateral force F1 (produced by the lateral force generating mechanism 14) and the resilient force (produced by the spring 15) affect the up and down movement of the pressing rod 13. Therein, the lateral force F1 affects the movement of the pressing stem 13 by generating a moment to the first support 11; the resilient force is always upward to make the pressing stem 13 tend to move upward. Therefore, the posture of the first support 11 will determine whether the moment makes the pressing stem 13 tend to move upward or downward. Please refer to FIG. 3 to FIG. 5. The pressing stem 13 can move up and down relative to the casing 10 through the first support 11 and the second support 12. The movement of the pressing stem 13 on the vertical direction Dv1 can be logically regarded as a reciprocating motion. Therein, when the pressing stem 13 reaches the highest point, the position of pressing stem 13 is defined as a top dead center, as shown by FIG. 3. When the pressing stem 13 reaches the lowest point, the position of pressing stem 13 is defined as a bottom dead center, as shown by FIG. 5. When the moment produced by the lateral force F1 to the first support 11 is zero, the position of pressing stem 13 is defined as an intermediate position, as shown by FIG. 4; therein, the lateral force F1 passes through the rotation axis A1 (indicated by a cross mark in the figures).

Therein, when the pressing stem 13 is at the top dead center (as shown by FIG. 3), the pressing stem connecting portion 112 is higher than the rotation axis A1 in the vertical direction Dv1, and the moment produced by lateral force F1 on the first support 11 relative to the rotation axis A1 is defined as a first moment M1 (indicated by an arc with an arrow in FIG. 3). The first moment M1 is a clockwise moment (from the view point of the sectional view) and can make the first support 11 tend to move upward; in other words, in the absence of other forces on the pressing stem 13, the first moment M1 itself will drive the first support 11 to rotate clockwise (relative to the rotation axis A1) to move the pressing stem 13 upward. In the movement of the pressing stem 13 between the top dead center and the intermediate position (i.e., during the movement away from the top center and toward the middle point, or away from the middle point and toward the top dead center), although the first moment M1 may vary, it is not zero; the closer the pressing stem 13 is to the intermediate position, the closer the first moment M1 is to zero.

Moreover, when the pressing stem 13 is at the bottom dead center (as shown by FIG. 3), the pressing stem connecting portion 112 is lower than the rotation axis A1 in the vertical direction Dv1, and the moment produced by lateral force F1 on the first support 11 relative to the rotation axis A1 is defined as a second moment M2 (indicated by an arc with an arrow in FIG. 5). The second moment M2 is a counterclockwise moment and can make the first support 11 tend to move downward; in other words, in the absence of other forces on the pressing stem 13, the second moment M2 itself will drive the first support 11 to rotate counterclockwise (relative to the rotation axis A1) to move the pressing stem 13 downward. Similarly, in the movement of the pressing stem 13 between the bottom dead center and the intermediate position (i.e., during the movement away from the bottom dead center and toward the middle point, or away from the middle point and toward the bottom dead center), although the second moment M2 may vary, it is not zero; the closer the pressing stem 13 is to the intermediate position, the closer the second moment M2 is to zero.

Figure 6:
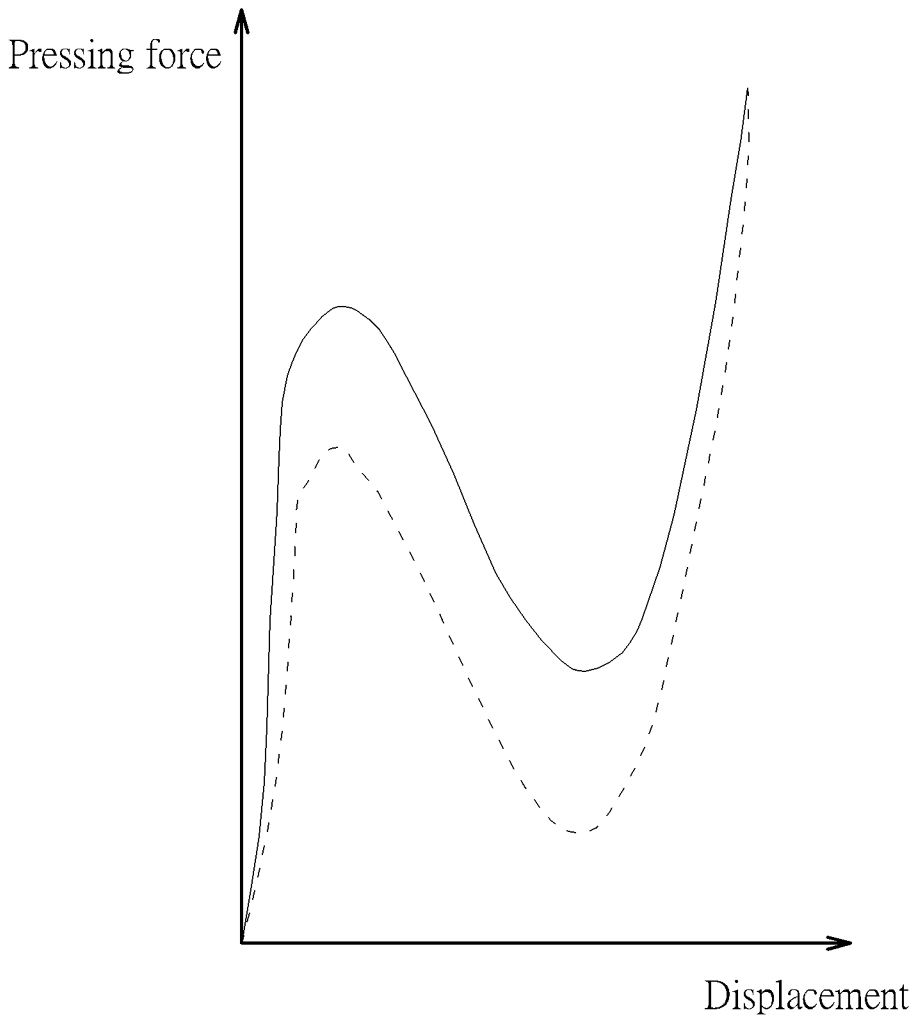
FIG. 6 is a graph of pressing force versus displacement of the pressing stem for the keyswitch structure in FIG. 1.

In the actual operation, the movement of the pressing stem 13 is determined by the resultant force of the external forces it receives. In the first embodiment, the external forces received by the pressing stem 13 mainly include the resilient force of the spring 15, the upward supporting forces of the first support 11 and the second support 12, and the pressing force (e.g., by the user's pressing); therein, the lateral force F1 indirectly affects the pressing stem 13 through the first support 11. In the first embodiment, the spring 15 provides vertical resilient force. The lateral force generating mechanism 14 can apply rotational forces in different directions to the first support 11 corresponding to different positions of the pressing stem 13 during the process of pressing the pressing stem 13, thereby creating a discontinuous pressing feeling (i.e., the tactile feedback of the user pressing). Please refer to FIG. 6, is a graph of pressing force versus displacement of the pressing stem 13 for the keyswitch structure 1; therein, the pressing force is the pressing force of the user (i.e., which is the source of the user's tactile feeling), and the displacement is the downward displacement of the pressing stem 13. The first curve (shown in solid line), i.e., the upper curve in the figure, corresponds to the case that the pressing stem 13 is pressed to move from the top dead center to the bottom dead center. The second curve (shown in solid line), i.e., the lower curve in the figure, corresponds to the case that the pressing stem 13 rebounds from the bottom dead center to the top dead center. The displacements corresponding to the peaks of the first and second curves are the intermediate positions. Therefore, when the pressing stem 13 passes through the intermediate positions, the user can sense a significant discontinuous feeling.

Furthermore, please refer to FIG. 3 to FIG. 5. In the keyswitch structure 1, the second support 12 also includes a triggering portion 126. A switch 16 (whose setting position is indicated by dashed lines) is correspondingly disposed on the lower cover 104. In the movement of the pressing stem 13 from the top dead center to the bottom dead center (e.g., when the pressing stem 13 is pressed by the user), the triggering portion 126 triggers the switch 16. For example, the switch 16 may be an optical switch, e.g., including a light transmitter and a light receiver. The triggering is realized by blocking the light emitted from the light transmitter to the light receiver through the triggering portion 126. However, it is not limited thereto in practice. For example, the switch 16 may be a mechanical switch (such as a tactile button) or a magnetic switch (such as a Hall switch). Furthermore, in practice, the triggering portion 126 can be changed to be disposed on the first support 11 and the switch 16 is disposed accordingly, which will not be described in addition.

Furthermore, in the keyswitch structure 1, the pressing stem 13 includes a base portion 132 and a column portion 134 extending upward from the base portion 132. The base portion 132 is located in the accommodating space **10*a* and is connected with the first support 11 and the second support 12. The column portion 134 protrudes from the casing 10 through the opening 10*b*. When the pressing stem 13 is at the top dead center and the bottom dead center, the pressing stem 13 does not touch the casing 10 in the vertical direction Dv1. In other words, the pressing stem 13 stops at the top dead center and the bottom dead center through the structural constraints of first support 11 and second support 12, instead of being blocked at the top dead center and the bottom dead center by structural stops of the casing 10 (e.g., stopping the base portion 132). Therefore, during the entire process of pressing the pressing stem 13, the pressing stem 13 (or the base portion 132 thereof) will not hit the casing 10, so the sound produced by hitting the casing 10 can be avoided. This structural configuration is conducive to the silent design. Furthermore, in the keyswitch structure 1, the pressing stem 13 is spaced from the casing 10; therein, the base portion 132 is not in contact with the inner wall of the accommodating space 10*a*, and the column portion 134 is not in contact with the periphery of the opening 10*b*. When the pressing stem 13 moves vertically between the top dead center and the bottom dead center, the pressing stem 13 is kept out of contact with the casing 10 in the horizontal direction Dh1**. This structural configuration is also conducive to silent designs.

Figure 7:
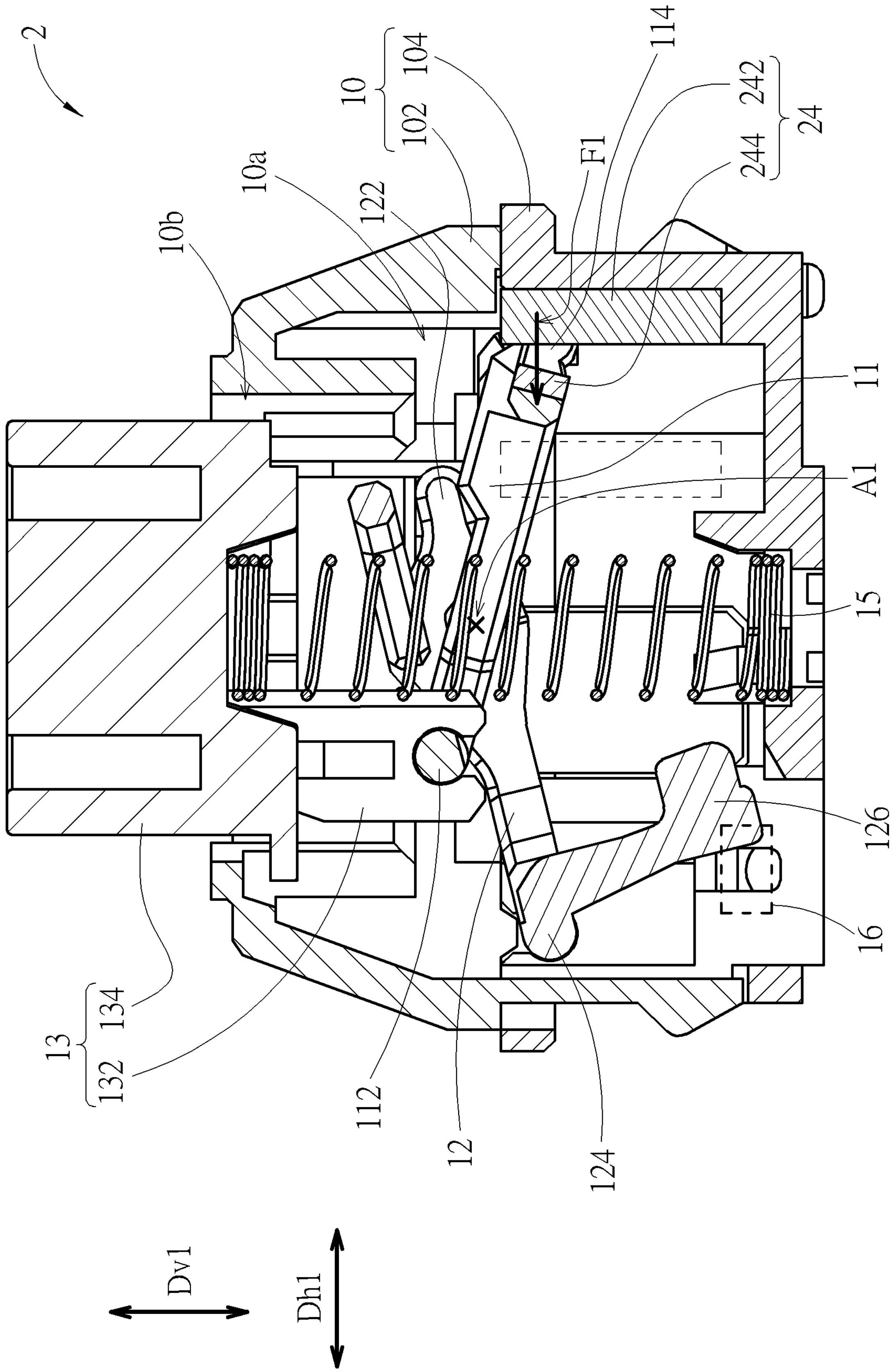
FIG. 7 is a sectional view of a keyswitch structure according to a second embodiment.

In the keyswitch structure 1, the lateral force generating mechanism 14 may be an elastic sheet; however, it is not limited thereto in practice. Please refer to FIG. 7, which is a sectional view of a keyswitch structure 2 according to a second embodiment; the position of the cutting plane is the same as the line X1-X1 in FIG. 1. The keyswitch structure 2 is substantially similar in structure to the keyswitch structure 1. The keyswitch structure 2 uses the reference symbols of the components of the keyswitch structure 1 in principle. For other descriptions of the keyswitch structure 2, please directly refer to the relevant descriptions and figures of the components with the same name in the keyswitch structure 1, which will not be repeated in addition. Compared with the keyswitch structure 1, a lateral force generating mechanism 24 of the keyswitch structure 2 includes two magnets 242 and 244 (simplified as blocks in the figure), which are oppositely disposed on the casing 10 and the first support 11. A repulsive force is generated by and between the magnets 242 and 244 (e.g., realized by arranging the magnets with the same magnetic poles facing each other) to act on the first support 11 as the lateral force F1. Therefore, the lateral force generating mechanism 24 can also have the same effect on the movement of the pressing stem 13 as the lateral force generating mechanism 14, which will not be repeated in addition.

Similarly, in practice, the magnet 242 can be changed to be disposed on the other side of the magnet 244 in the horizontal direction Dh1 (as shown by dashed lines), so that a magnetic attraction force is generated by and between the two magnets (e.g., realized by arranging the magnets with the opposite magnetic poles facing each other) as the lateral force F1. This structural configuration can also have the above effect on the movement of the pressing stem 13. Moreover, in the instance, one of the magnets 242 and 244 can be replaced with an iron part, which can also generate magnetic attraction. The above instances will not be further described.

Figure 8:
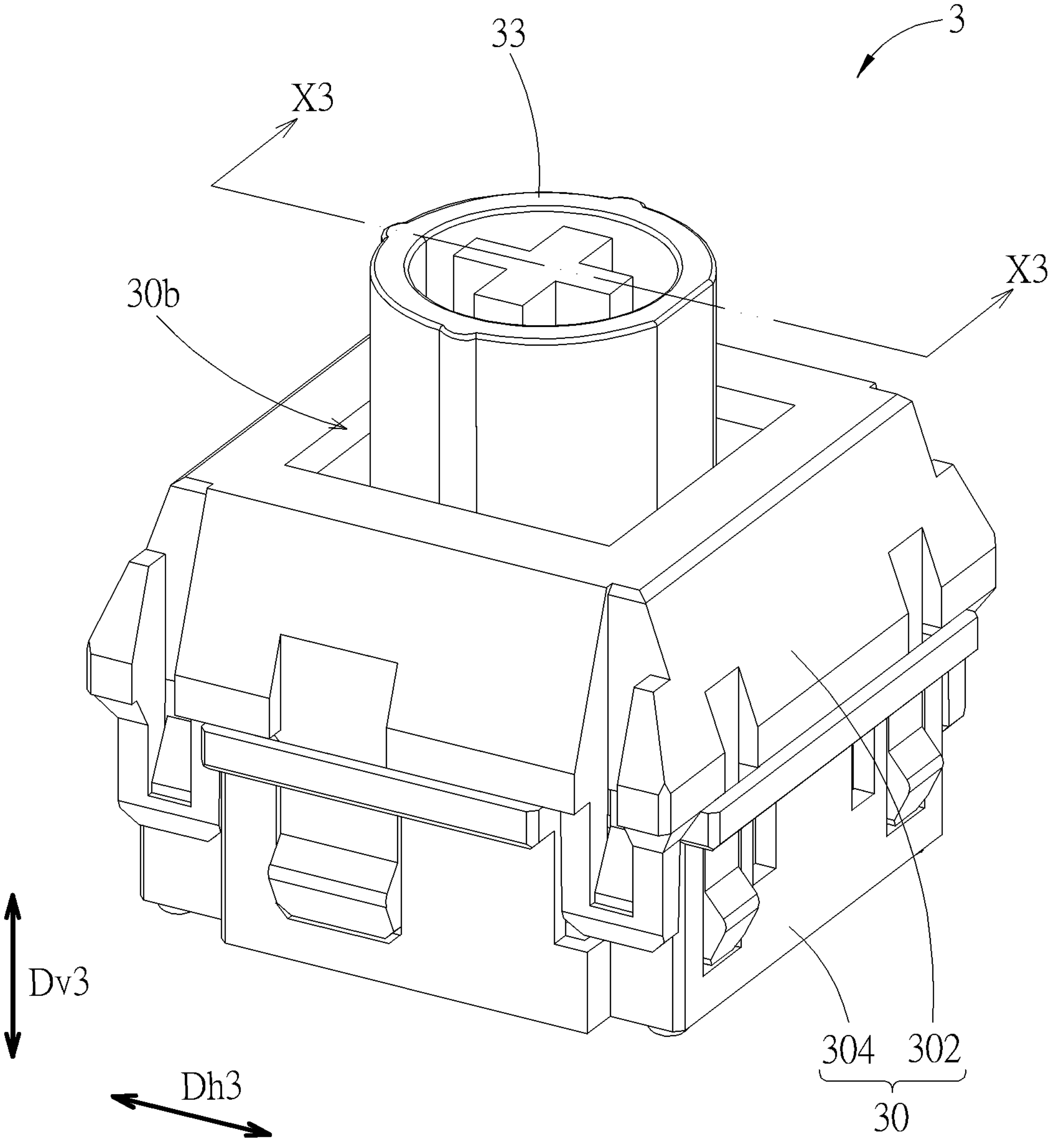
FIG. 8 is a schematic diagram illustrating a keyswitch structure according to a third embodiment.
Figure 9:
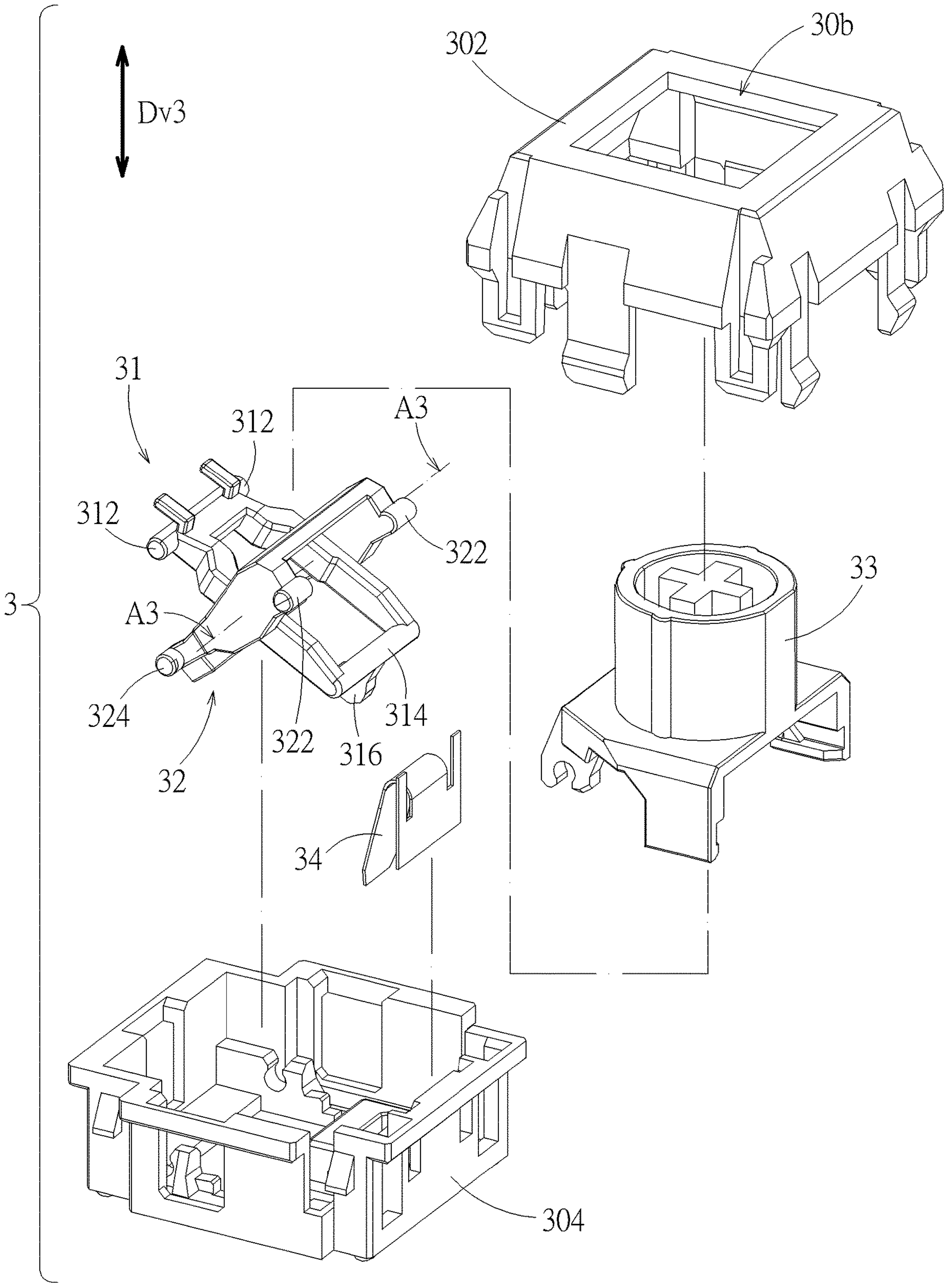
FIG. 9 is an exploded view of the keyswitch structure in FIG. 8.
Figure 10:
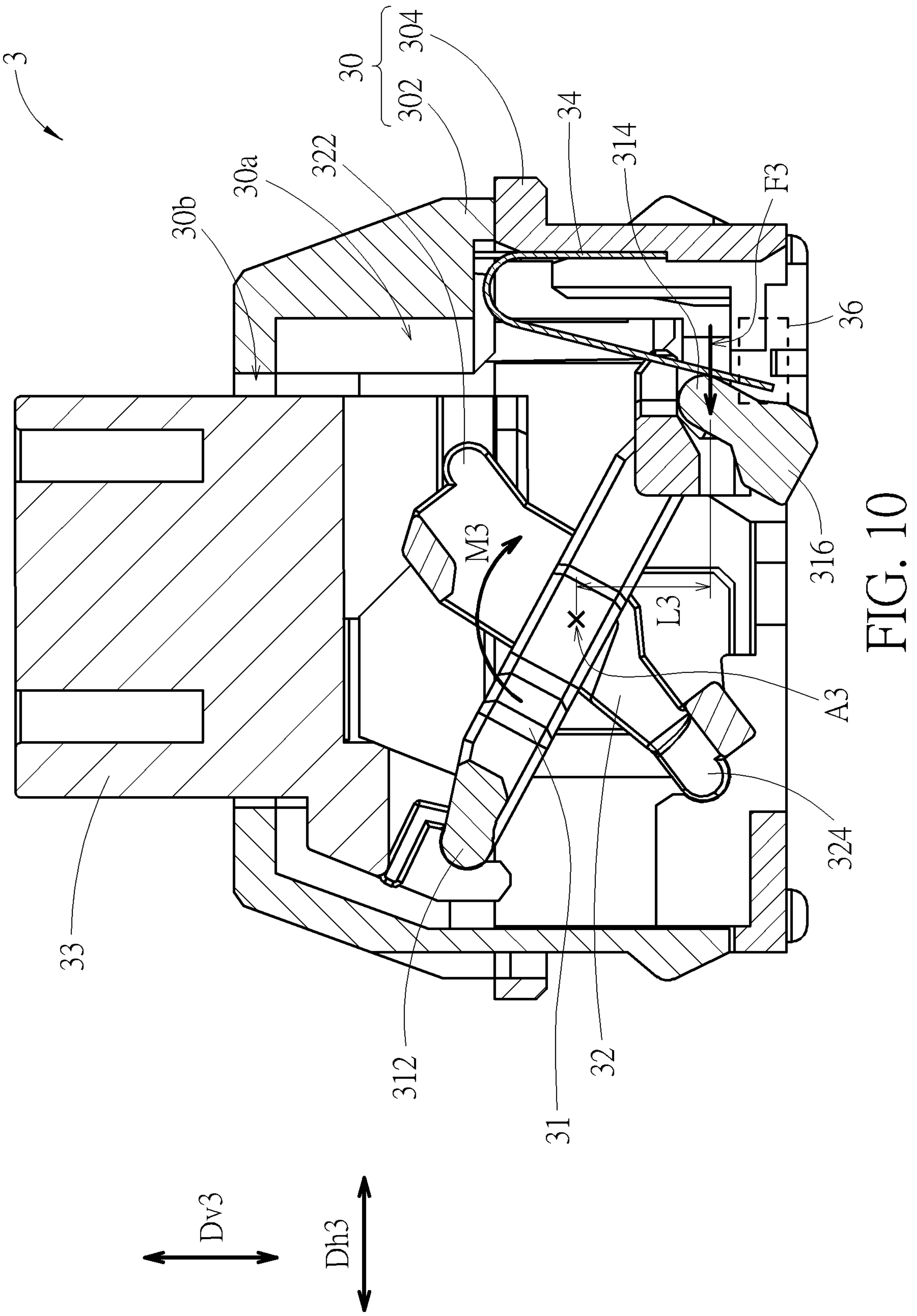
FIG. 10 is a sectional view of the keyswitch structure in FIG. 8 along the line X3-X3.

Please refer to FIG. 8 to FIG. 10. A keyswitch structure 3 according to a third embodiment includes a casing 30, a first support 31, a second support 32, a pressing stem 33, and a lateral force generating mechanism 34. The casing 30 includes an upper cover 302 and a lower cover 304. The upper cover 302 and the lower cover 304 are engaged to form an accommodating space **30*a*. The upper cover 302 has an opening 30*b* communicating with the accommodating space 30*a*. The first support 31 and the second support 32 are disposed in the accommodating space 30*a* and are pivotally connected with each other relative to a rotation axis A3 (in FIG. 9, indicated by a chain line; in FIG. 10, indicated by a cross mark). The pressing stem 33 extends into the accommodating space 30*a* to be rotatably connected with the first support 31 and the second support 32, and protrudes from the casing 30 through the opening 30*b*. Both the first support 31 and the second support 32 are directly and rotatably connected to the casing 30 and the pressing stem 33. Therein, the first support 31 has a pressing stem connecting portion 312 and is pivotally connected with the pressing stem 33 through the pressing stem connecting portion 312. The first support 31 also has a casing connecting portion 314 and is slidably and rotatably connected with the casing 30 (or a sliding slot formed on the lower cover 304) through the casing connecting portion 314. The second support 32 has a pressing stem connecting portion 322 and is slidably and rotatably connected with the pressing stem 33 (or a sliding slot formed on the upper cover 302) through the pressing stem connecting portion 322. The second support 32 also has a casing connecting portion 324 and is pivotally connected with the casing 30 (or the lower cover 304 thereof) through the casing connecting portion 324. The pressing stem 33 is movable parallel to a vertical direction Dv3 (indicated by a double-headed arrow in the figures) relative to the casing 30 through the first support 31 and the second support 32 (i.e., the pressing stem 33** can move up and down).

Furthermore, the lateral force generating mechanism 34 is disposed in the accommodating space 30*a* and can apply a lateral force F3 to the first support 31. The lateral force F3 is not parallel to the vertical direction Dv3. In the third embodiment, the lateral force F3 is substantially parallel to a horizontal direction Dh3 (indicated by a double-headed arrow in the figures), i.e., perpendicular to the vertical direction Dv3. The lateral force F3 pushes the first support 31 (or the casing connecting portion 314 or a portion of the first support 31 close to the casing connecting portion 314) to make the pressing stem 33 tend to move upward or downward (as described below).

Figure 11:
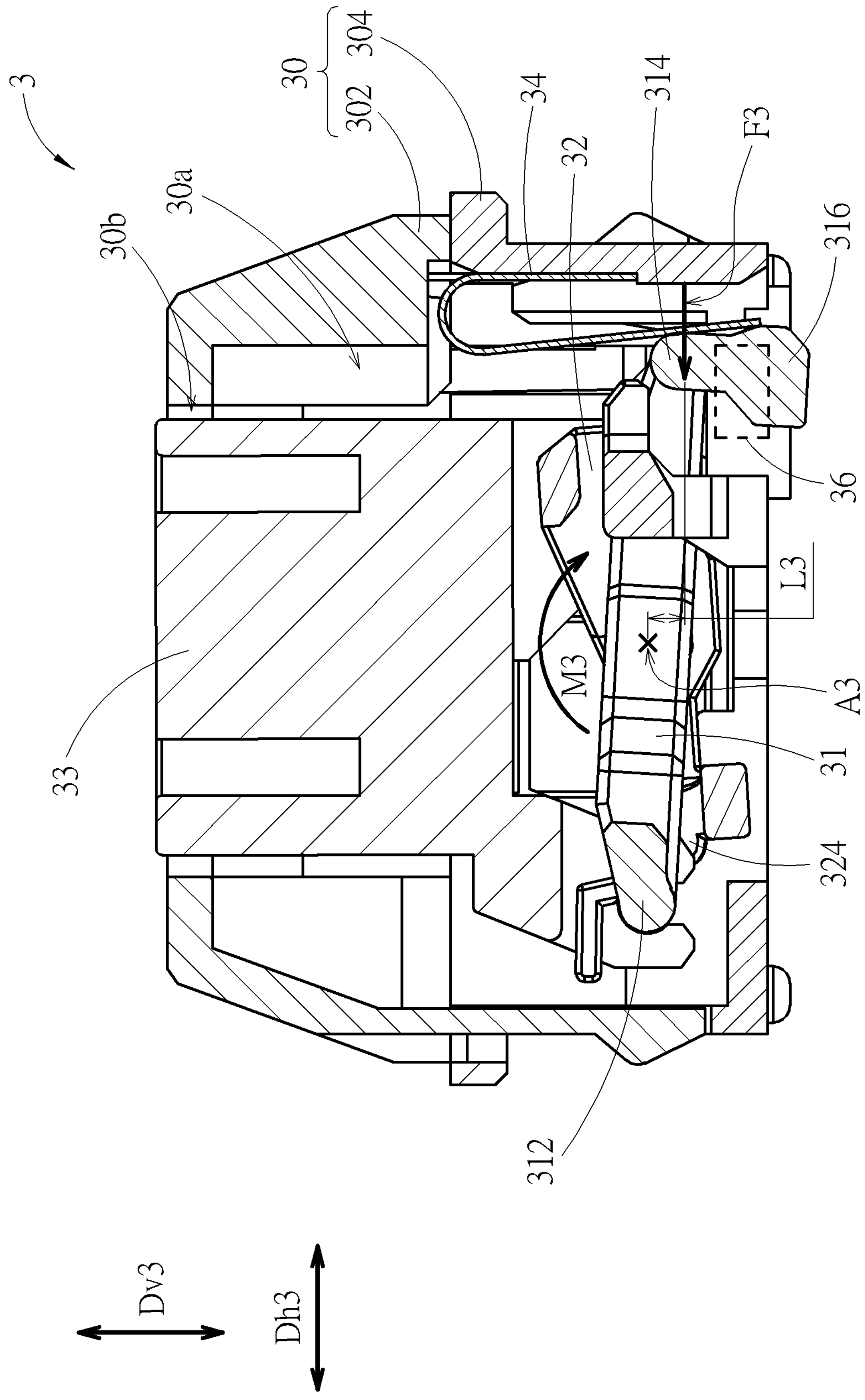
FIG. 11 is a sectional view of the keyswitch structure in FIG. 10 when the pressing stem is at a bottom dead center.

Please refer to FIG. 10 and FIG. 11. The pressing stem 33 can move up and down relative to the casing 30 through the first support 31 and the second support 32. The movement of the pressing stem 33 on the vertical direction Dv3 can be logically regarded as a reciprocating motion. Therein, when the pressing stem 33 reaches the highest point, the position of pressing stem 33 is defined as a top dead center, as shown by FIG. 10. When the pressing stem 33 reaches the lowest point, the position of pressing stem 33 is defined as a bottom dead center, as shown by FIG. 11. During the movement of pressing stem 33, the pressing stem connecting portion 322 is always higher than the rotation axis A3 in the vertical direction Dv3. The lateral force F3 produces a moment M3 (indicated by an arc with an arrow in FIG. 10 and FIG. 11) relative to the rotation axis A3 for the first support 31. The direction of the moment M3 is always clockwise (from the view point of the sectional view), and the moment M3 can make the first support 31 tend to move upward; in other words, in the absence of other forces on the pressing stem 33, the moment M3 itself will drive the first support 31 to rotate clockwise (relative to the rotation axis A3) to move the pressing stem 33 upward.

Figure 12:
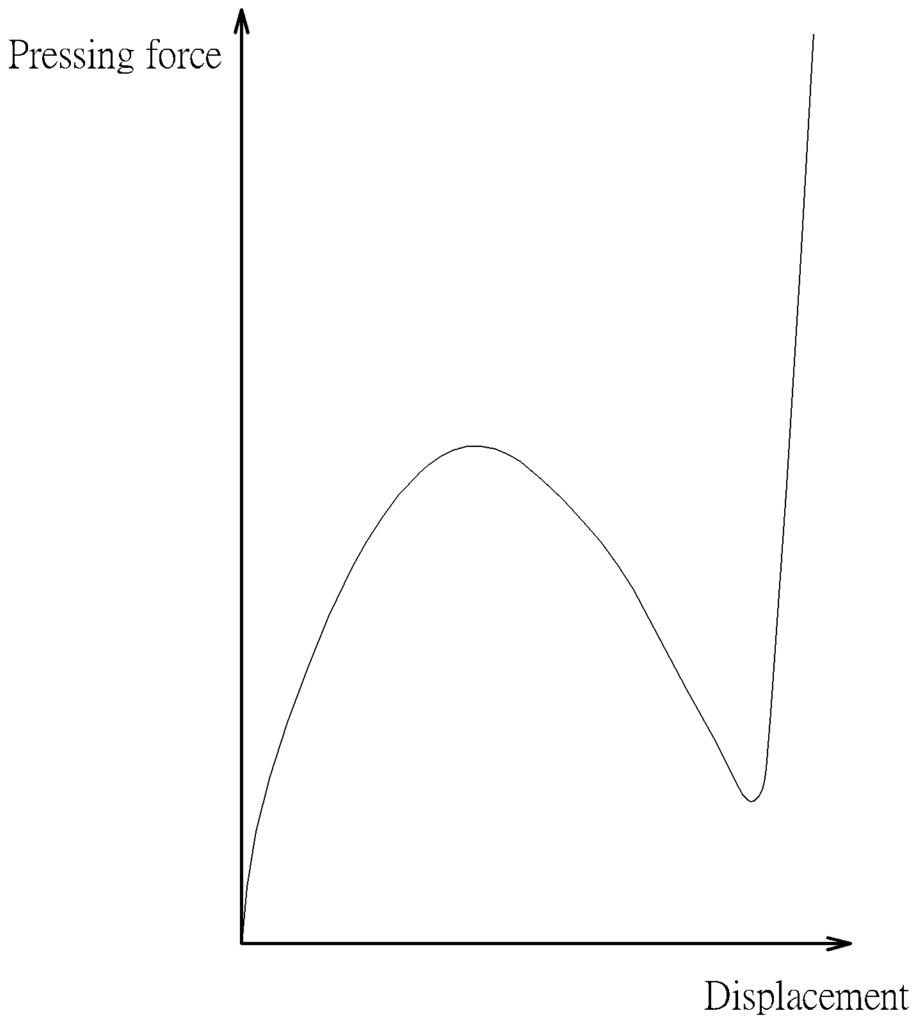
FIG. 12 is a graph of pressing force versus displacement of the pressing stem for the keyswitch structure in FIG. 8.

In the actual operation, the movement of the pressing stem 33 is determined by the resultant force of the external forces it receives. In the third embodiment, the external forces received by the pressing stem 33 mainly include the upward supporting forces of the first support 31 and the second support 32, and the pressing force (e.g., in practice, a keycap is fixedly connected to the pressing stem 33, and a user can press the pressing stem 33 by pressing the keycap); therein, the lateral force F3 indirectly affects the pressing stem 33 through the first support 31. The moment M3 will change with the position of the pressure stem 33, thereby creating a discontinuous pressing feeling. The moment M3 is the product of the lateral force F3 and a lever arm L3. When the pressing stem 33 moves from the top dead center to the bottom dead center, the lever arm L3 gradually decreases, but the lateral force F3 gradually increases, and the change of their product (i.e., the moment M3) is similar to that of the curve in FIG. 12, which will not be described further. Therein, FIG. 12 is a graph of pressing force versus displacement of the pressing stem 33 for the keyswitch structure 3. In FIG. 12, the pressing force is the pressing force of the user (i.e., which is the source of the user's tactile feeling), and the displacement is the downward displacement of the pressing stem 33. The curve (shown in solid line) in the figure corresponds to the case that the pressing stem 33 is pressed to move from the top dead center to the bottom dead center. The peak of the curve occurs between the top dead center and the bottom dead center (e.g., relatively close to the bottom dead center). Thereby, when pressing the stem 33, the user can sense a significant discontinuous feeling. Furthermore, in the embodiment, the trough of the curve occurs close to the bottom dead center; at this moment, the moment M3 is the smallest and close to zero.

Furthermore, please refer to FIG. 9 and FIG. 10. In the keyswitch structure 3, the first support 31 also includes a triggering portion 316. A switch 36 (whose setting position is indicated by dashed lines) is correspondingly disposed on the lower cover 304. In the movement of the pressing stem 33 from the top dead center to the bottom dead center (e.g., when the pressing stem 33 is pressed by the user), the triggering portion 316 triggers the switch 36. For example, the switch 36 may be an optical switch, e.g., including a light transmitter and a light receiver. The triggering is realized by blocking the light emitted from the light transmitter to the light receiver through the triggering portion 316. However, it is not limited thereto in practice. For example, the switch 36 may be a mechanical switch (such as a tactile button) or a magnetic switch (such as a Hall switch). Furthermore, in practice, the triggering portion 316 can be changed to be disposed on the second support 32 and the switch 36 is disposed accordingly, which will not be described in addition.

Furthermore, similar to the keyswitch structure 1, in the keyswitch structure 3, the pressing stem 33 is spaced from the casing 30, so that during the movement of the pressing stem 33 in the vertical direction Dv3, the pressing stem 33 never touches casing 30. Therefore, during the process of the user pressing the keyswitch structure 3, in principle, there will be no sound due to the impact of the components. This structural configuration is conducive to the silent design.

Figure 13:
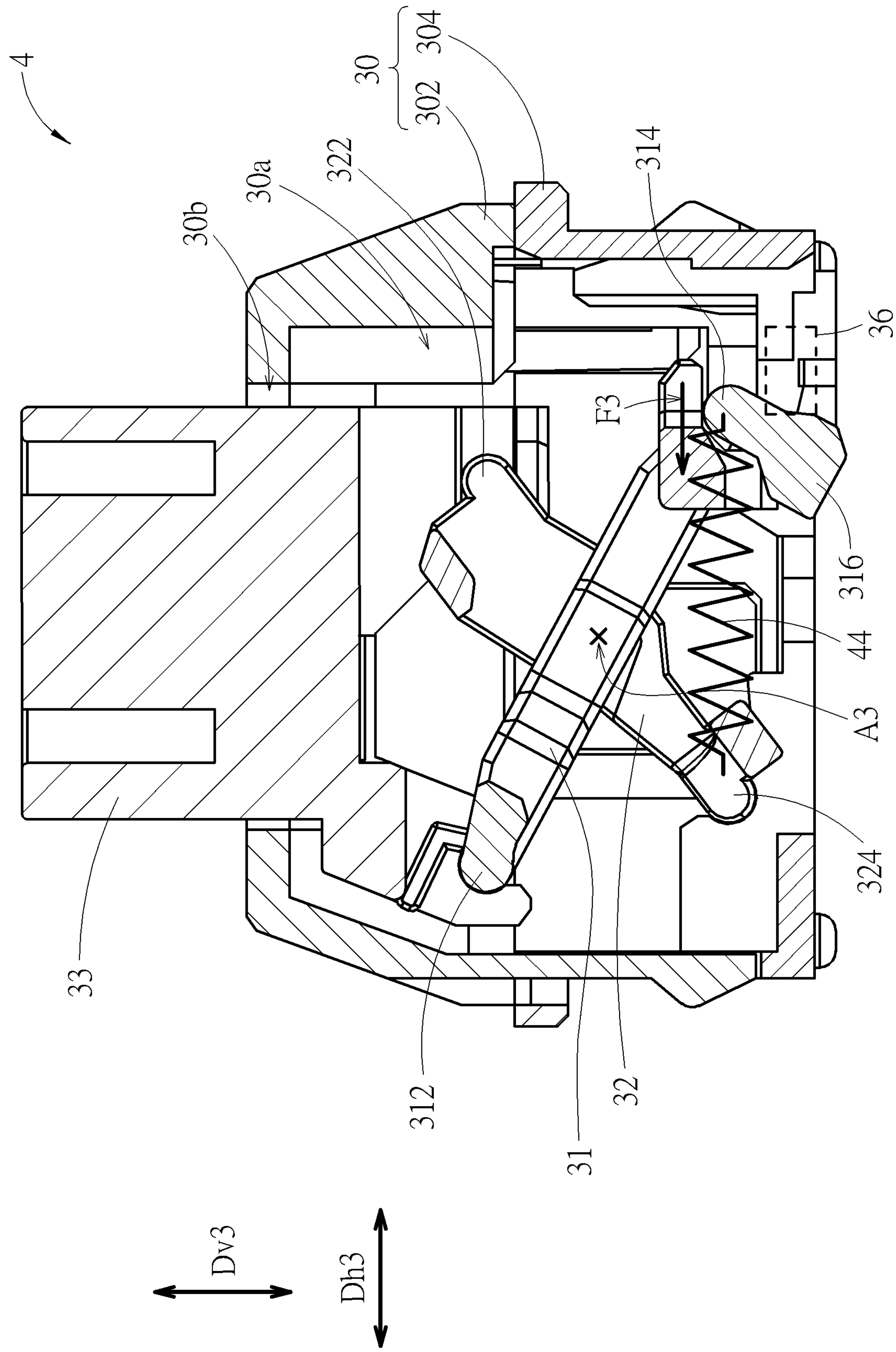
FIG. 13 is a sectional view of a keyswitch structure according to a fourth embodiment.

Furthermore, in the third embodiment, the lateral force generating mechanism 34 may be a bent elastic sheet, which is fixed on the lower cover 304. In practice, the bent elastic sheet can be replaced with other elastic parts. For example, please refer to FIG. 13, which is a sectional view of a keyswitch structure 4 according to a fourth embodiment; the position of the cutting plane is the same as the line X3-X3 in FIG. 8. The keyswitch structure 4 is substantially similar in structure to the keyswitch structure 3. The keyswitch structure 4 uses the reference symbols of the components of the keyswitch structure 3 in principle. For other descriptions of the keyswitch structure 4, please directly refer to the relevant descriptions and figures of the components with the same name in the keyswitch structure 3, which will not be repeated in addition. Compared with the keyswitch structure 3, a lateral force generating mechanism 44 of the keyswitch structure 4 is realized by a tension spring (shown in thick lines in the figure), which is pre-tensioned and set in the accommodating space 30*a*. An end of the tension spring is connected to the casing connecting portion 314 of the first support 31, and the other end of the tension spring is connected to the casing connecting portion 324 of the second support 32 (or the lower cover 304 of the casing 30). The resilient force of the tension spring is applied to the first support 31 as the lateral force F3. The lateral force generating mechanism 44 can also have the same effect on the movement of the pressing stem 33 as the lateral force generating mechanism 34, which will not be repeated in addition.

Figure 14:
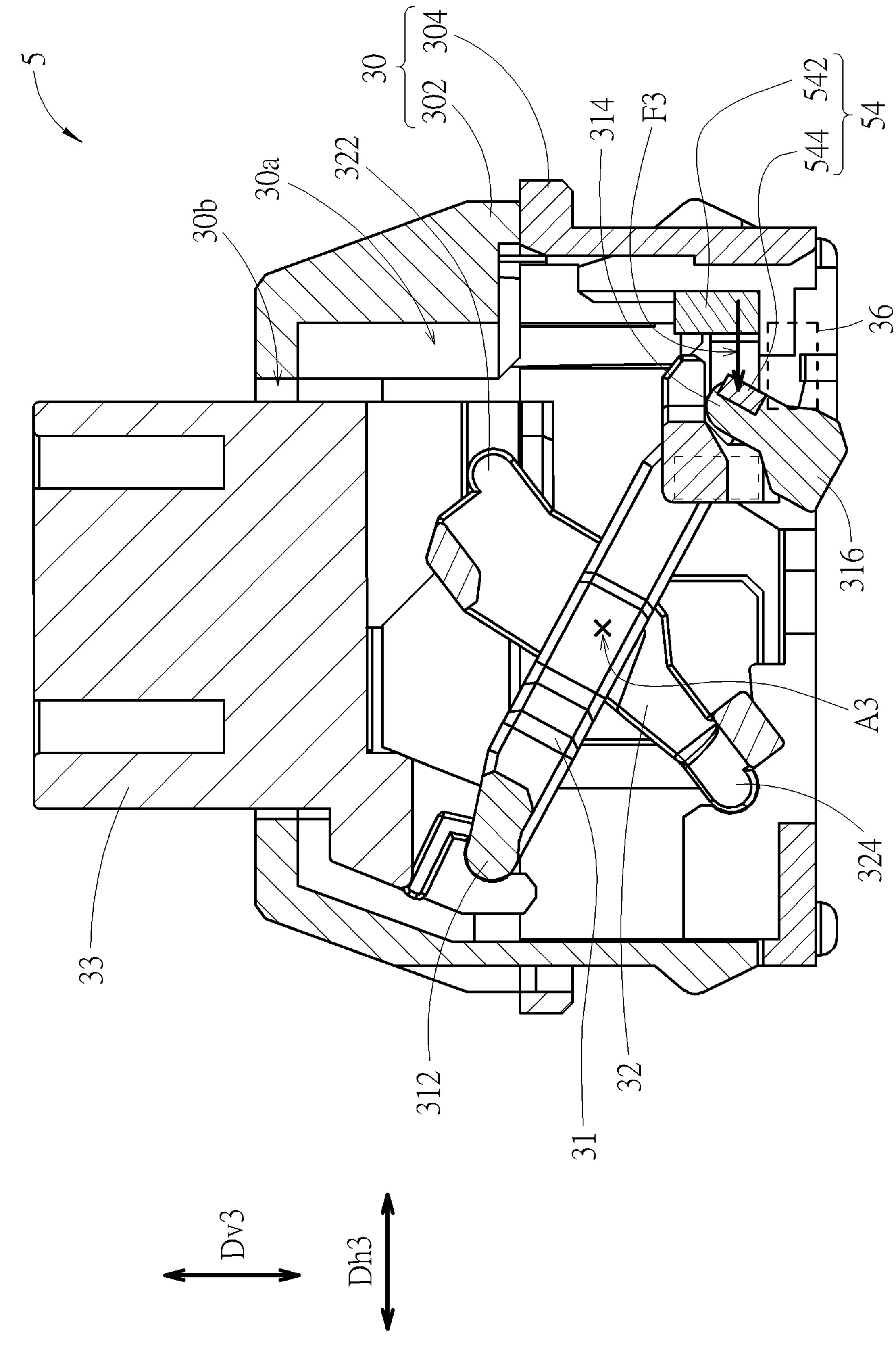
FIG. 14 is a sectional view of a keyswitch structure according to a fifth embodiment.

For another example, please refer to FIG. 14, which is a sectional view of a keyswitch structure 5 according to a fifth embodiment; the position of the cutting plane is the same as the line X3-X3 in FIG. 8. The keyswitch structure 5 is substantially similar in structure to the keyswitch structure 3. The keyswitch structure 5 uses the reference symbols of the components of the keyswitch structure 3 in principle. For other descriptions of the keyswitch structure 5, please directly refer to the relevant descriptions and figures of the components with the same name in the keyswitch structure 3, which will not be repeated in addition. Compared with the keyswitch structure 3, a lateral force generating mechanism 54 of the keyswitch structure 5 includes two magnets 542 and 544 (simplified as blocks in the figure), which are oppositely disposed on the casing 30 and the first support 31. A repulsive force is generated by and between the magnets 542 and 544 (e.g., realized by arranging the magnets with the same magnetic poles facing each other) to act on the first support 31 as the lateral force F3. Therefore, the lateral force generating mechanism 54 can also have the same effect on the movement of the pressing stem 33 as the lateral force generating mechanism 34, which will not be repeated in addition.

Similarly, in principle, the magnet 542 can be changed to be disposed on the other side of the magnet 544 in the horizontal direction Dh3 (as shown by dashed lines), so that a magnetic attraction force is generated by and between the two magnets (e.g., realized by arranging the magnets with the opposite magnetic poles facing each other) as the lateral force F3. This structural configuration can also have the above effect on the movement of the pressing stem 33. Moreover, in the instance, one of the magnets 542 and 544 can be replaced with an iron part, which can also generate magnetic attraction. The above instances will not be further described.

In addition, although the aforementioned keyswitch structures 3, 4 and 5 do not use the spring 15 in the keyswitch structure 1 as the driving force for the pressing stem 33 to restore, in practice, a spring can also be pre-compressed and disposed in the keyswitch structures 3, 4 and 5. The spring abuts against and between the casing 30 (or the lower cover 304 thereof) and the pressing stem 33 in the vertical direction Dv3. This spring has the same function as the spring 15 in keyswitch structure 1, which will not repeated in addition.

Figure 15:
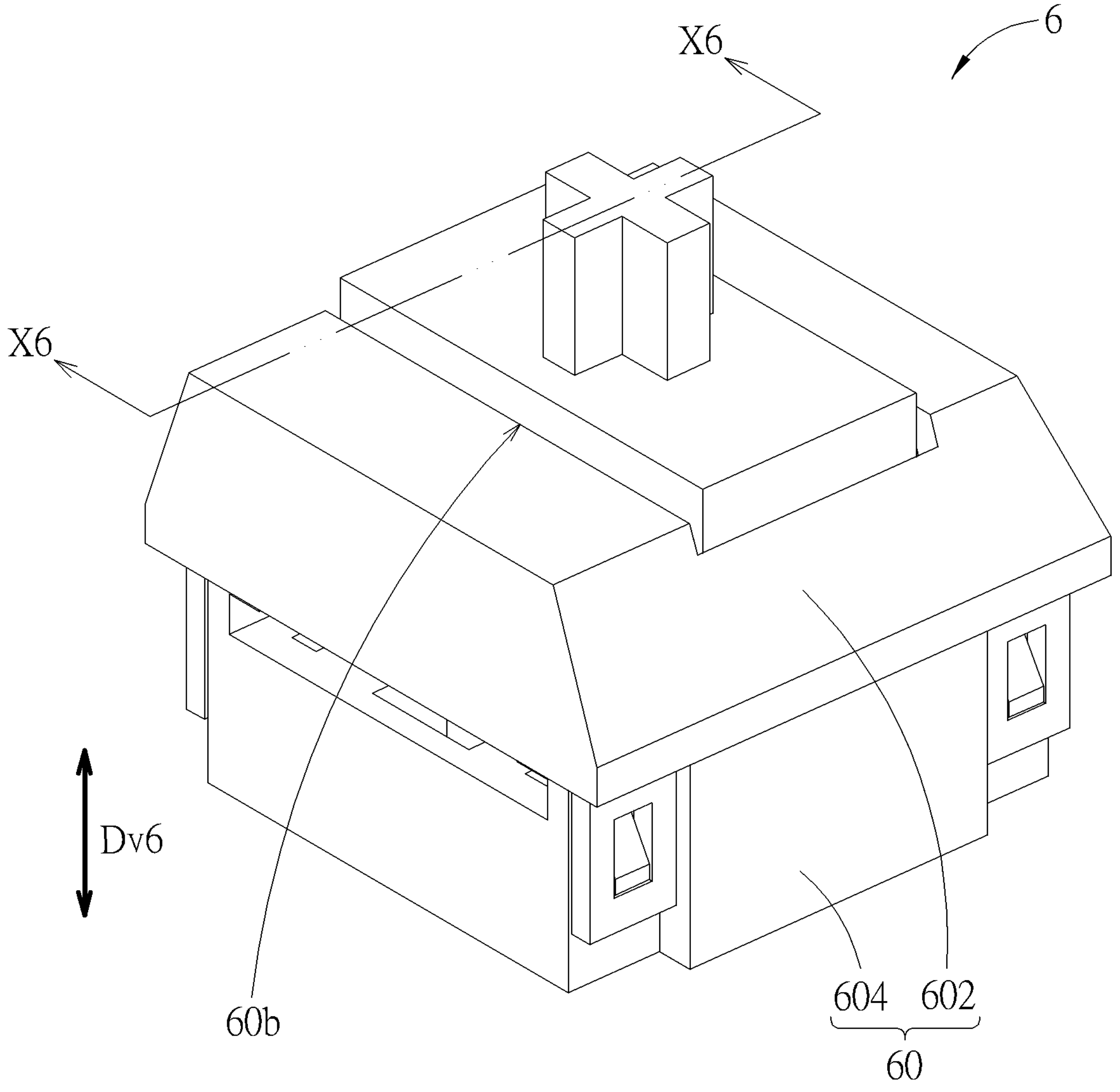
FIG. 15 is a schematic diagram illustrating a keyswitch structure according to a sixth embodiment.
Figure 16:
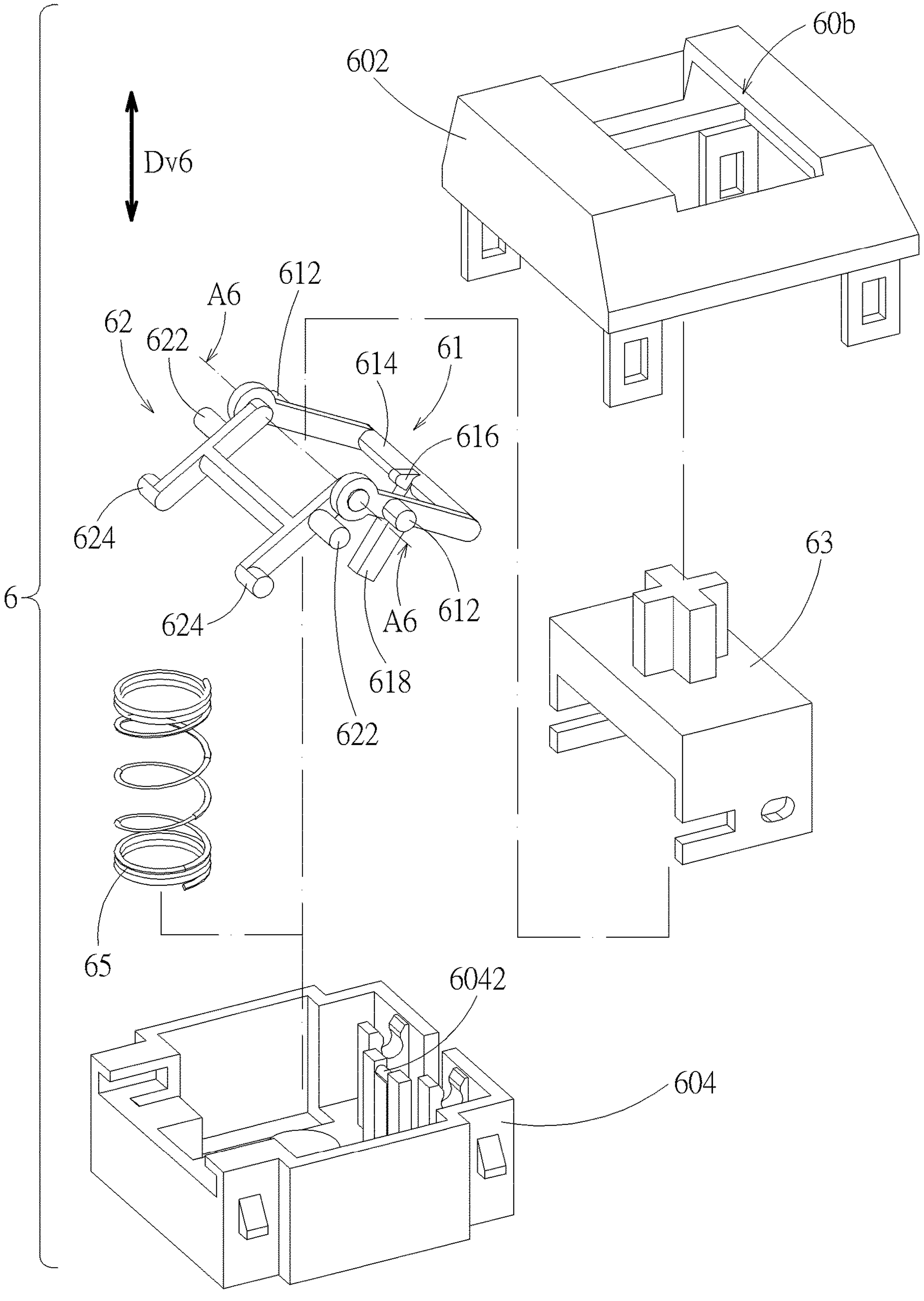
FIG. 16 is an exploded view of the keyswitch structure in FIG. 15.
Figure 17:
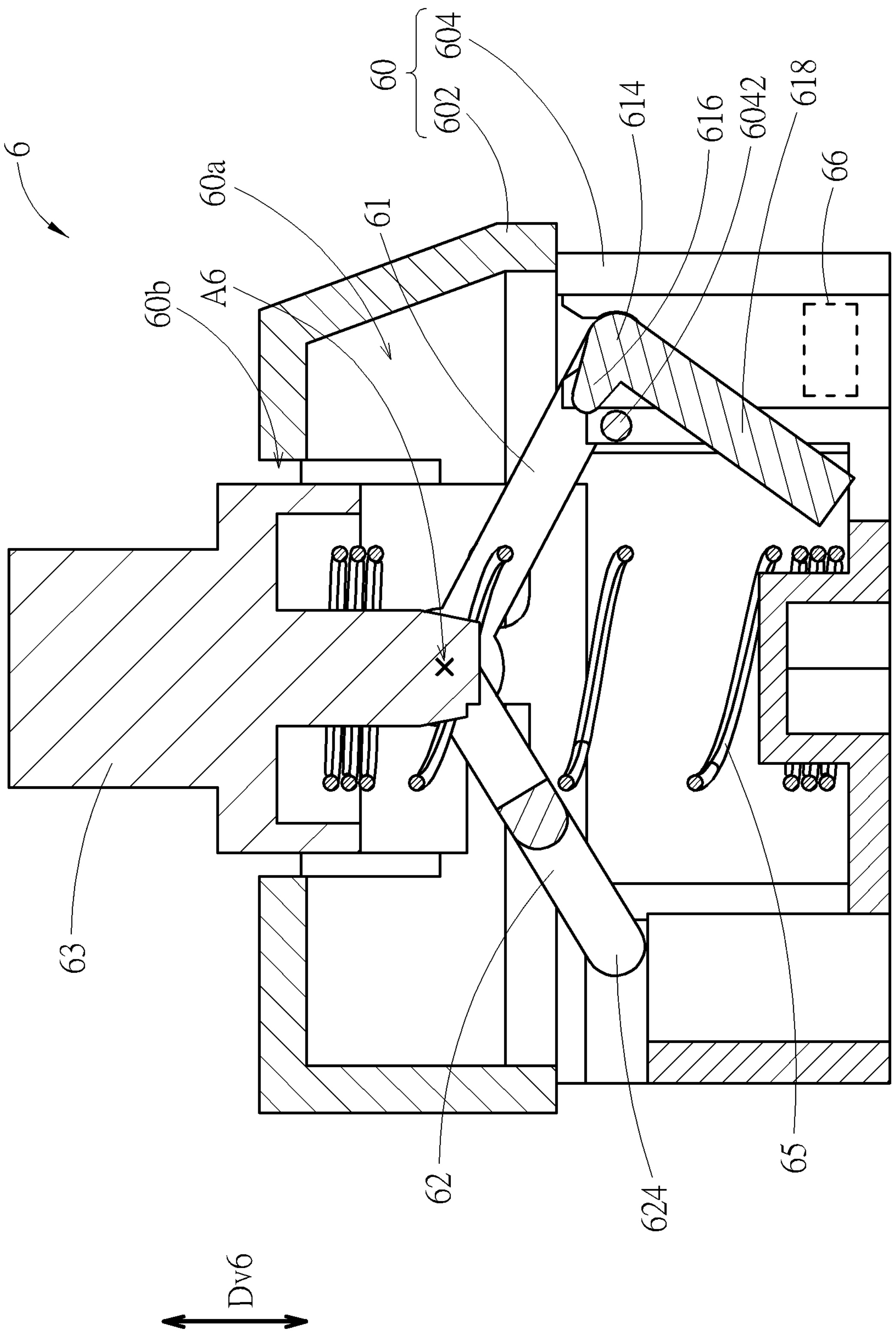
FIG. 17 is a sectional view of the keyswitch structure in FIG. 15 along the line X6-X6.

Please refer to FIG. 15 to FIG. 17. A keyswitch structure 6 according to a sixth embodiment includes a casing 60, a first support 61, a second support 62, a pressing stem 63, and a spring 65. The casing 60 includes an upper cover 602 and a lower cover 604. The upper cover 602 and the lower cover 604 are engaged to form an accommodating space 60*a*. The upper cover 602 has an opening 60*b* communicating with the accommodating space 60*a*. The first support 61 and the second support 62 are disposed in the accommodating space 60*a* and are pivotally connected with each other relative to a rotation axis A6 (in FIG. 16, indicated by a chain line; in FIG. 17, indicated by a cross mark). The pressing stem 63 extends into the accommodating space 60*a* to be rotatably connected with the first support 61 and the second support 62, and protrudes from the casing 60 through the opening 60*b*. Both the first support 61 and the second support 62 are directly and rotatably connected to the casing 60 and the pressing stem 63. Therein, the first support 61 has a pressing stem connecting portion 612 and a casing connecting portion 614. The first support 61 is slidably and rotatably connected with the pressing stem 63 through the pressing stem connecting portion 612, and is pivotally connected with the casing 60 (or the lower cover 604 thereof) through the casing connecting portion 614. The second support 62 has a pressing stem connecting portion 622 and a casing connecting portion 624. The second support 62 is slidably and rotatably connected with the pressing stem 63 and the casing 60 (or the lower cover 604 thereof) via the pressing stem connecting portion 622 and the casing connecting portion 624, respectively. The pressing stem 63 is movable parallel to a vertical direction Dv6 (indicated by a double-headed arrow in the figures) relative to the casing 60 through the first support 61 and the second support 62 (i.e., the pressing stem 63 can move up and down).

The spring 65 is pre-compressed and disposed in the accommodating space 60*a* and abuts against and between the casing 60 (or the lower cover 604 thereof) and the pressing stem 63 in the vertical direction Dv6. When the pressing stem 63 is pressed (e.g., in practice, a keycap is fixedly connected to the pressing stem 63, and a user can press the pressing stem 63 by pressing the keycap), the pressing stem 63 moves downward parallel to the vertical direction Dv6 through the first support 61 and the second support 62 and squeezes the spring 65. The resilient force (of which the direction is upward) produced by the squeezed spring 65 (i.e., the elastically deformed spring 65) can exert an upward force on the pressing stem 63, so that the spring 65 tends to move upward in the vertical direction Dv6.

Figure 18:
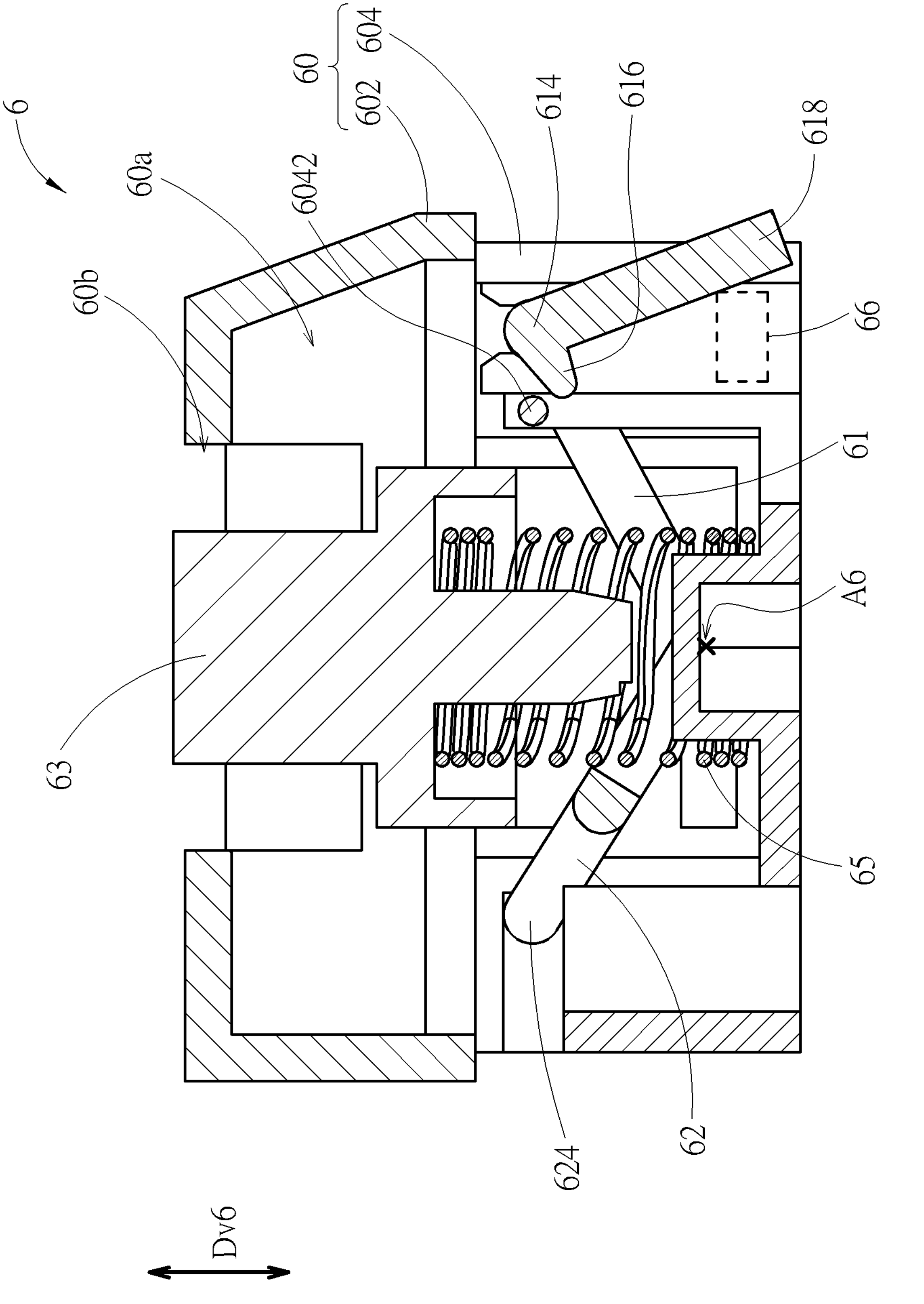
FIG. 18 is a sectional view of the keyswitch structure in FIG. 17 when the pressing stem is at a bottom dead center.

Please refer to FIG. 17 and FIG. 18. The pressing stem 63 can move up and down relative to the casing 60 through the first support 61 and the second support 62. The movement of the pressing stem 63 on the vertical direction Dv6 can be logically regarded as a reciprocating motion. Therein, when the pressing stem 63 reaches the highest point, the position of pressing stem 63 is defined as a top dead center, as shown by FIG. 17. When the pressing stem 63 reaches the lowest point, the position of pressing stem 63 is defined as a bottom dead center, as shown by FIG. 18. In the keyswitch structure 6, the casing 60 also has a fixed interference portion 6042 on the lower cover 604 in the accommodating space 60*a*. The first support 61 has a protruding portion 616. When the pressing stem 63 is at the top dead center and the bottom dead center, the protruding portion 616 does not touch the fixed interference portion 6042. In the movement of the pressing stem 63 moving from the top dead center to the bottom dead center, the protruding portion 616 produces elastic structural interference with the fixed interference portion 6042, so that the fixed interference portion 6042 can generate resistance to the protruding portion 616 to obstruct the clockwise rotation of the first support 61 from rotating clockwise (from the view point of the sectional view). On the other hand, the elastic structural interference between the protruding portion 616 and the fixed interference portion 6042 can create a discontinuous pressing feeling.

Furthermore, in the keyswitch structure 6, the first support 61 also includes a triggering portion 618. A switch 66 (whose setting position is indicated by dashed lines) is correspondingly disposed on the lower cover 604. In the movement of the pressing stem 63 from the top dead center to the bottom dead center (e.g., when the pressing stem 63 is pressed by the user), the triggering portion 618 triggers the switch 66. For example, the switch 66 may be an optical switch, e.g., including a light transmitter and a light receiver. The triggering is realized by blocking the light emitted from the light transmitter to the light receiver through the triggering portion 618. However, it is not limited thereto in practice. For example, the switch 66 may be a mechanical switch (such as a tactile button) or a magnetic switch (such as a Hall switch). Furthermore, in practice, the triggering portion 618 can be changed to be disposed on the second support 62 and the switch 66 is disposed accordingly, which will not be described in addition.

Furthermore, similar to the keyswitch structure 1, in the keyswitch structure 6, the pressing stem 63 is spaced from the casing 60, so that during the movement of the pressing stem 63 in the vertical direction Dv6, the pressing stem 63 never touches casing 60. Therefore, during the process of the user pressing the keyswitch structure 6, in principle, there will be no sound due to the impact of the components. This structural configuration is conducive to the silent design.

Figure 19:
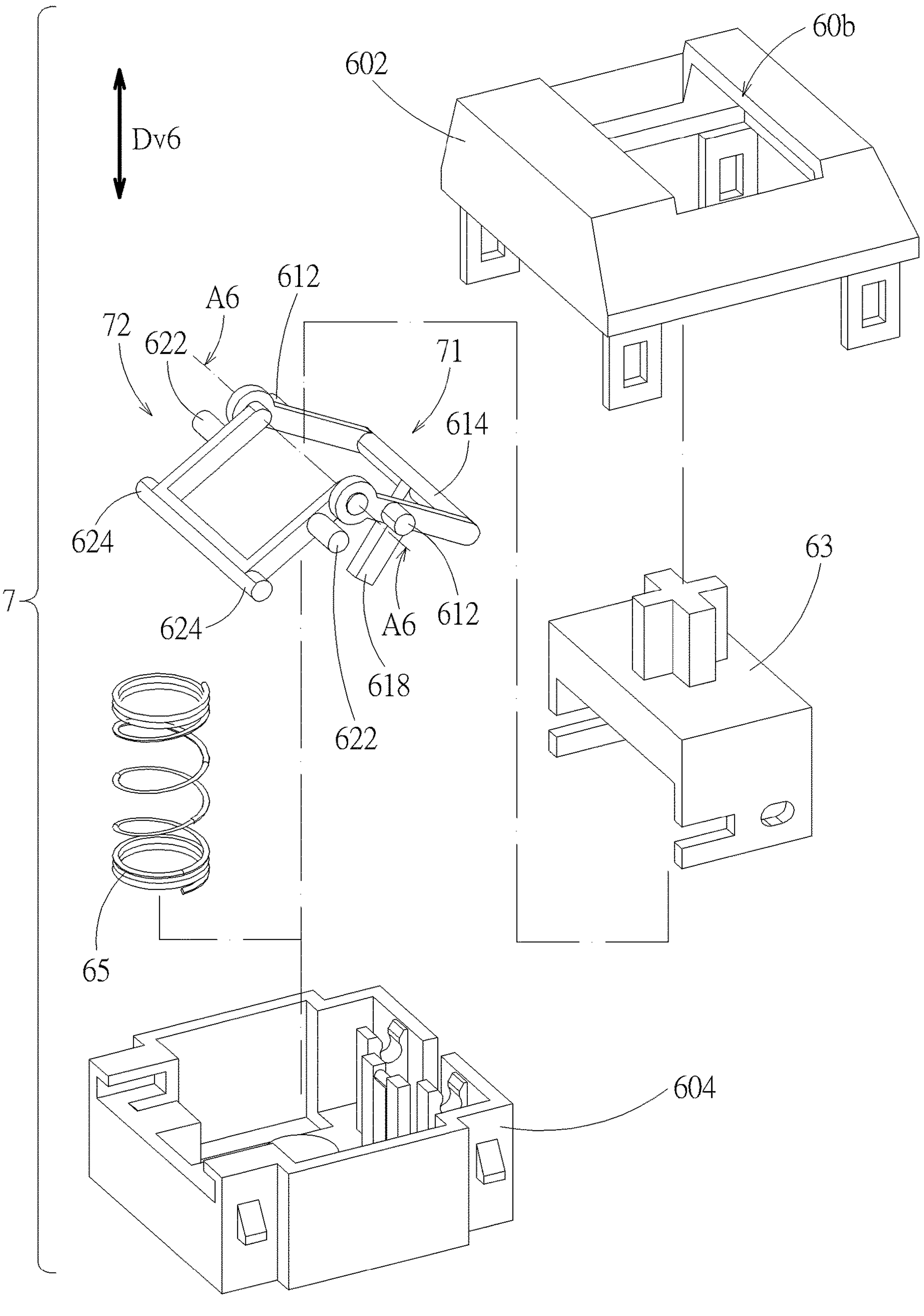
FIG. 19 is an exploded view of a keyswitch structure according to a seventh embodiment.
Figure 20:
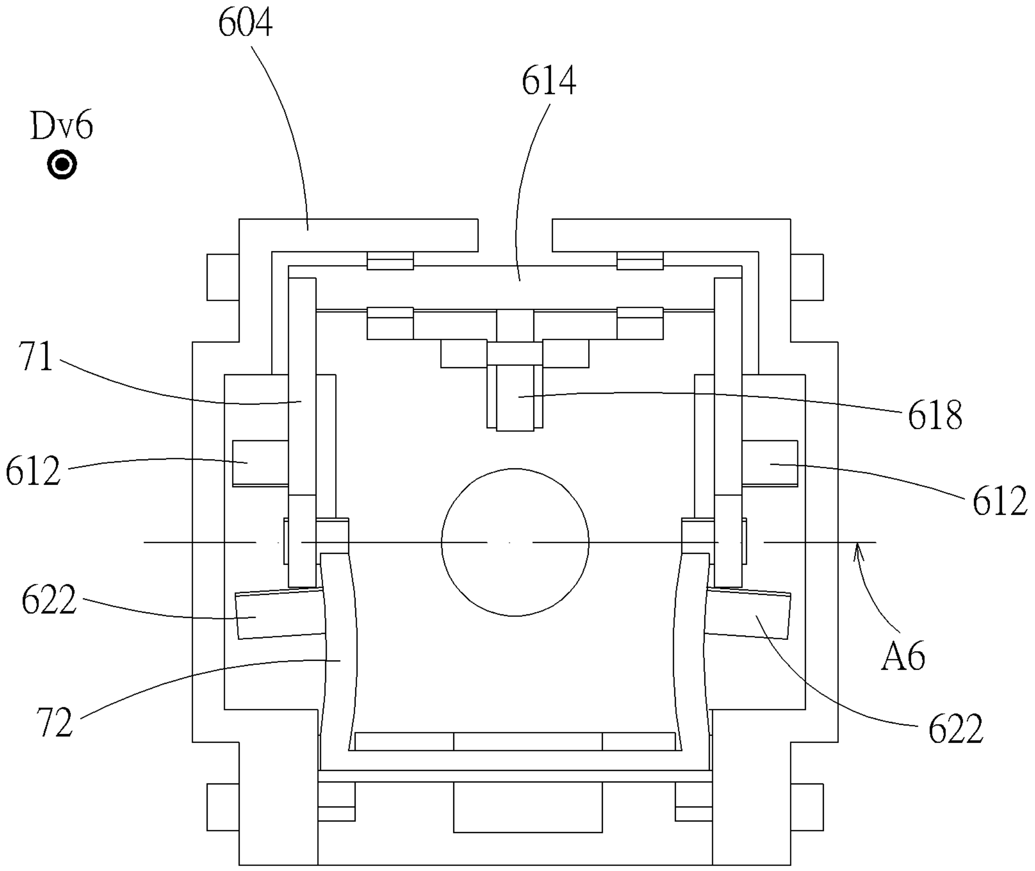
FIG. 20 is a top view of first and second supports inside the keyswitch structure in FIG. 19 and a lower cover; therein, the first and second supports are in a horizontal posture.

The keyswitch structure 6 uses the elastic structure interference between the first support 61 and the casing 60 to provide a discontinuous pressing feeling; however, it is not limited thereto in practice. For example, please refer to FIG. 19, which is an exploded view of a keyswitch structure 7 according to a seventh embodiment. The keyswitch structure 7 is substantially similar in structure to the keyswitch structure 6. The keyswitch structure 7 uses the reference symbols of the components of the keyswitch structure 6 in principle. For other descriptions of the keyswitch structure 7, please directly refer to the relevant descriptions and figures of the components with the same name in the keyswitch structure 6, which will not be repeated in addition. Compared with the keyswitch structure 6, the keyswitch structure 7 uses the elastic deformation of its supports to provide a discontinuous pressing feeling. Please also refer to FIG. 20, which is a top view of first and second supports 71 and 72 inside the keyswitch structure 7 and the lower cover 604; therein, the first and second supports 71 and 72 are in a horizontal posture. In the seventh embodiment, the pressing stem 63 of the keyswitch structure 7 also moves up and down relative to the casing 60 through the first support 71 and the second support 72, logically forming a reciprocating motion. Please refer to FIG. 17 and FIG. 18 for the sectional view of the keyswitch structure 7 when the pressing stem 63 is at the top dead center and the bottom dead center, which will not be shown by another figure. When the pressing stem 63 is at the top dead center and the bottom dead center, the first support 71 and the second support 72 are not deformed. In the process of pressing the pressing stem 63 from the top dead center to the bottom dead center, the second support 72 is elastically deformed. Therein, in principle, when the first support 71 and the second support 72 are in a horizontal posture, the elastic deformation of the second support 72 reaches a maximum, as shown by FIG. 20. In the seventh embodiment, the elastic deformation of the second support 72 is realized by designing the slot on the pressing stem 63 (i.e., the pressing stem connecting portion 622 that is connected with the second support 72), such as the length of the slot. When the second support 72 rotates and gradually approaches the horizontal posture, the second support 72 starts to be elastically deformed by bending and gradually increases the degree of bending. This elastic deformation provides a discontinuous pressing feeling. In practice, it is practicable to design the first support 71 to be elastically deformed to provide a discontinuous pressing feeling. It is also practicable to design both the first support 71 and the second support 72 to be elastically deformed to jointly provide a discontinuous pressing feeling.

Figure 21:
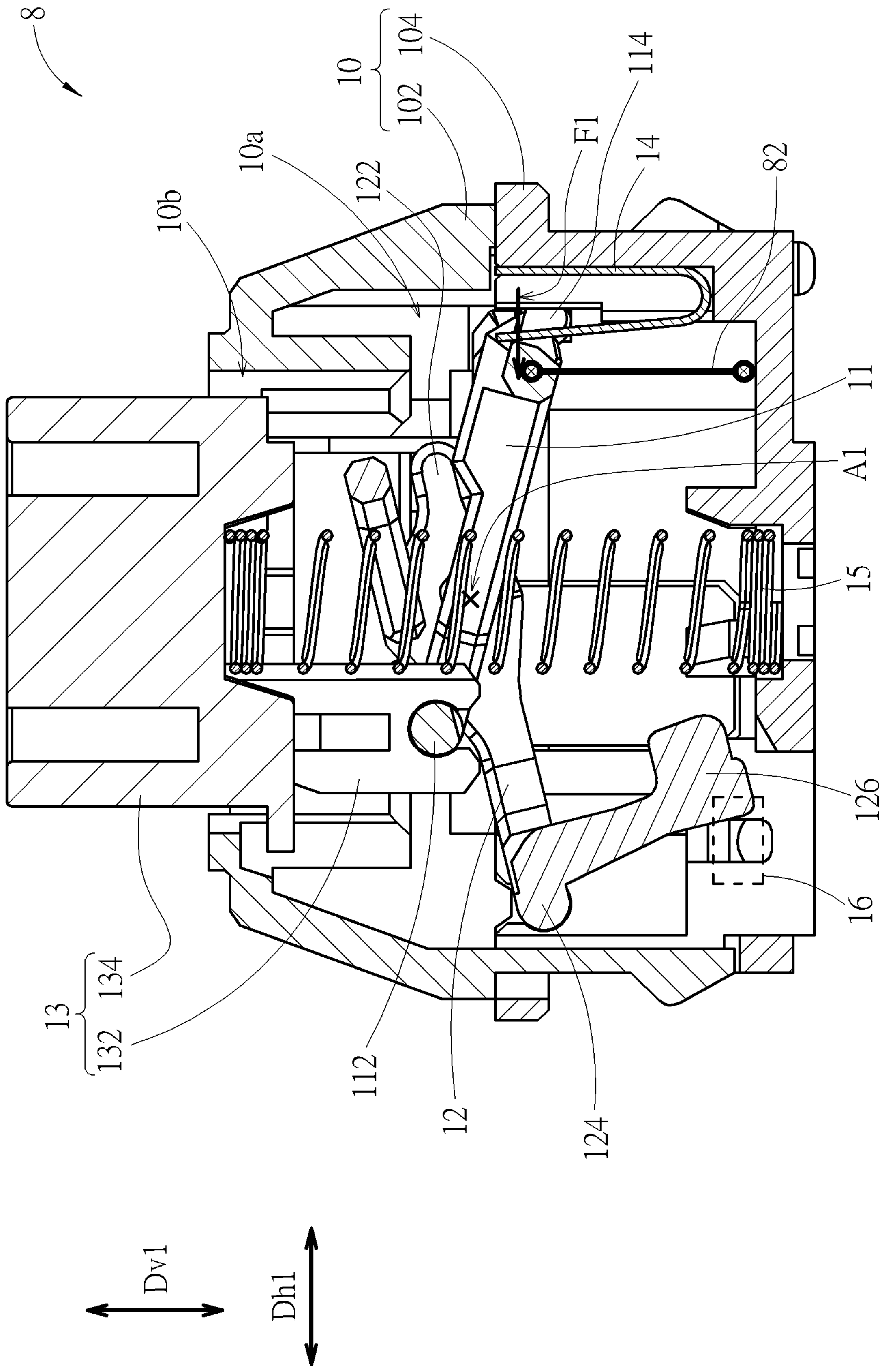
FIG. 21 is a sectional view of a keyswitch structure according to an eighth embodiment.
Figure 22:
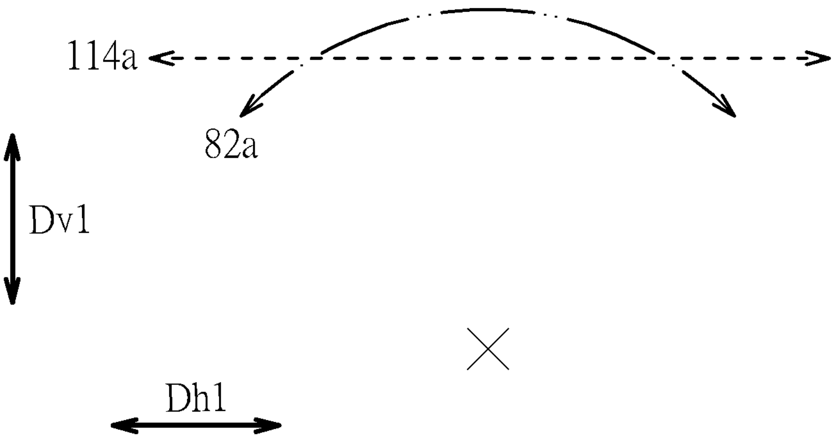
FIG. 22 is a schematic diagram illustrating interference between movement tracks of a first support and a link of the keyswitch structure in FIG. 21.

In practice, one or more of the designs of discontinuous pressing feeling in the above embodiments can be implemented in the same keyswitch structure, which will not be repeated further. In addition, in the above embodiments, the top and bottom dead centers of the pressing stems 13, 33 and 63 are determined by the action of the mechanisms formed mainly by the connection relationship of the first and second supports 11, 12, 31, 32, 61, 62, 71 and 72 with the pressing stem 13, 33 and 63 and the casing 10, 30 and 60. In practice, constraints on the movement of other components can be added to the above mechanisms to help prevent the pressing stems 13, 33 and 63 from hitting the casings 10, 30 and 60. For example, please refer to FIG. 21, which is a sectional view of a keyswitch structure 8 according to an eighth embodiment; the position of the cutting plane is the same as the line X1-X1 in FIG. 1. The keyswitch structure 8 is substantially similar in structure to the keyswitch structure 1. The keyswitch structure 8 uses the reference symbols of the components of the keyswitch structure 1 in principle. For other descriptions of the keyswitch structure 8, please directly refer to the relevant descriptions and figures of the components with the same name in the keyswitch structure 1, which will not be repeated in addition. Compared with the keyswitch structure 1, the keyswitch structure 8 further includes a link 82 (shown by a simple thick line in the figure) which is pivotally connected to the casing 10 (or the lower cover 104 thereof) in the accommodating space 10*a*. The link 82 (or an end portion thereof) is pivotally connected with the casing connecting portion 114 of the first support 11. Please also refer to FIG. 22, which is a schematic diagram illustrating interference between movement tracks of the link 82 and the casing connecting portion 114. The movement track 114*a* of the casing connecting portion 114 is a horizontal straight line (indicated by a straight dashed line with double arrows in the figure). The movement track 82*a* of the end portion of the link 82 connected with the casing connecting portion 114 in principle an arc (indicated by a curved chain line with double arrows in FIG. 22). The two movement tracks 114*a* and 82*a* have two intersection points. In principle, the end portion of the link 82 and the casing connecting portion 114 only move between the two intersection points, and then the link 82 limits the movement range of the casing connecting portion 114, indirectly controlling the locations of the upper and bottom dead centers of the pressing stem 13. The control of the top and bottom dead centers is not achieved by directly blocking the casing connecting portion 114 with a structure (such as the closed end of the slot on the lower cover 104), so when the pressing stem 13 reaches the top and bottom dead centers, the casing connecting portion 114 will not hit the lower cover 104 to produce impact sound. Therefore, this structural configuration can further reduce the sound when the keyswitch structure 8 is in operation (relative to the keyswitch structure 1).

In addition, in the keyswitch structure 8, in logic, the movement track of the end portion of the link 82 and the movement track of the casing connecting portion 114 do not exactly coincide between the two intersection points, so in practice, the link 82 can be designed to be elastically deformable, so that the link 82 can be bent and deformed so that the end portion thereof and the casing connecting portion 114 can actually move in a straight line (consistent with the movement track of the casing connecting portion 114). Besides, in the keyswitch structure 8, the resilient force generated by the elastically deformed link 82 can be designed not to substantially affect the movement of other components (e.g., the lateral force generating mechanism 14). However, it is not limited thereto in practice. For example, the resilient force of the link 82 is also considered in the design of the discontinuous pressing feeling.

Figure 23:
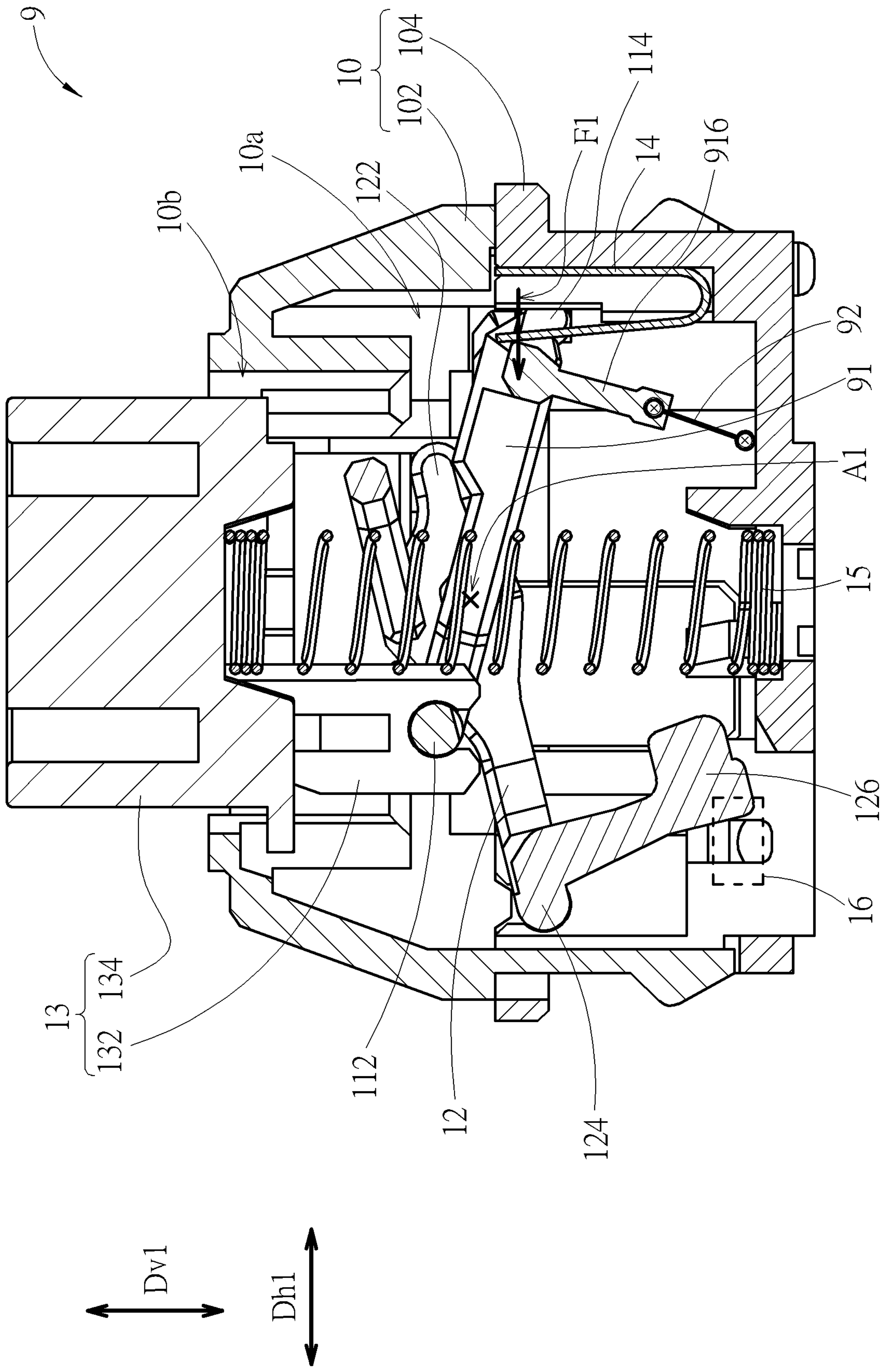
FIG. 23 is a sectional view of a keyswitch structure according to a ninth embodiment.
Figure 24:
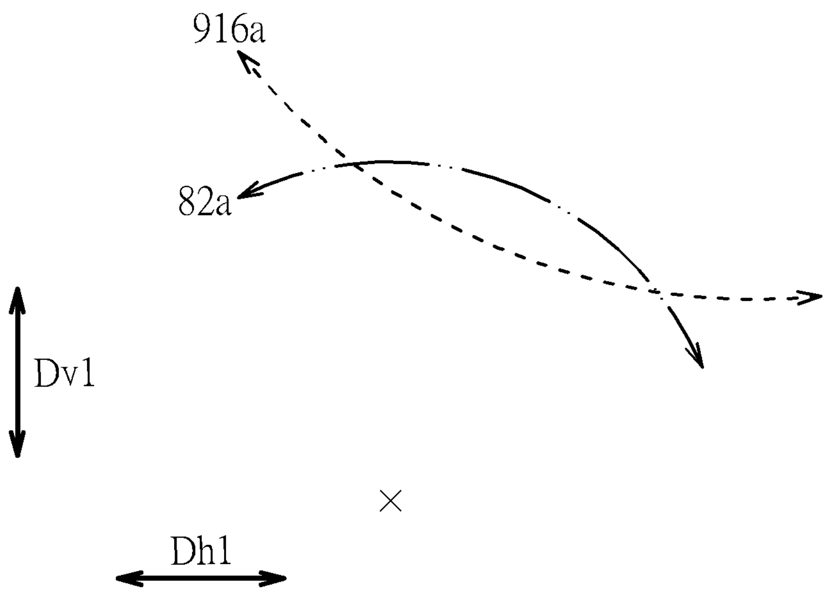
FIG. 24 is a schematic diagram illustrating interference between movement tracks of a first support and a link of the keyswitch structure in FIG. 23.

Furthermore, for another example, please refer to FIG. 23, which is a sectional view of a keyswitch structure 9 according to a ninth embodiment; the position of the cutting plane is the same as the line X1-X1 in FIG. 1. The keyswitch structure 9 is substantially similar in structure to the keyswitch structure 1. The keyswitch structure 9 uses the reference symbols of the components of the keyswitch structure 1 in principle. For other descriptions of the keyswitch structure 9, please directly refer to the relevant descriptions and figures of the components with the same name in the keyswitch structure 1, which will not be repeated in addition. Compared with the keyswitch structure 1, the keyswitch structure 9 further includes a link 92 (shown by a simple thick line in the figure), and a first support 91 of the keyswitch structure 9 further includes an extension portion 916 extending from the casing connecting portion 114. The link 92 is pivotally connected to the casing 10 (or the lower cover 104 thereof) in the accommodating space 10*a*. The link 92 (or an end portion thereof) is pivotally connected with the extension portion 916 of the first support 91. Please also refer to FIG. 24, which is a schematic diagram illustrating interference between movement tracks of the link 92 and the extension portion 916. The movement track 916*a* of the extension portion 916 (connected with the link 92) is an arc (indicated by a curved dashed line with double arrows in figure). The end portion of the link 92 connected with the extension portion 916 is also an arc (indicated by a curved chain line with double arrows in the figure). The two movement tracks 916*a* and 92*a* have two intersection points. In principle, the end portion of the link 92 and the casing connecting portion 916 only move between the two intersection points, and then the link 92 limits the movement range of the casing connecting portion 916, indirectly controlling the locations of the upper and bottom dead centers of the pressing stem 13. Similarly (compared with the keyswitch structure 8), the control of the top and bottom dead centers is not achieved by directly blocking the casing connecting portion 114 with a structure (such as the closed end of the slot on the lower cover 104), so when the pressing stem 13 reaches the top and bottom dead centers, the casing connecting portion 114 will not hit the lower cover 104 to produce impact sound. Therefore, this structural configuration can further reduce the sound when the keyswitch structure 9 is in operation (relative to the keyswitch structure 1).

Furthermore, in the keyswitch structure 9, in logic, the movement track of the end portion of the link 92 and the movement track of the casing connecting portion 914 do not exactly coincide between the two intersection points, so in practice, the link 92 can be designed to be elastically deformable, so that the link 92 can be bent and deformed so that the end portion thereof and the casing connecting portion 114 can actually move in an arc (consistent with the movement track of the casing connecting portion 114). Besides, in the keyswitch structure 9, the resilient force generated by the elastically deformed link 92 can be designed not to substantially affect the movement of other components (e.g., the lateral force generating mechanism 14). However, it is not limited thereto in practice. For example, the resilient force of the link 92 is also considered in the design of the discontinuous pressing feeling.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch structure, comprising:

a casing, the casing forming an accommodating space and having an opening communicating with the accommodating space;

a first support, the first support being disposed in the accommodating space and being directly and rotatably connected with the casing;

a second support, the second support being disposed in the accommodating space and being directly and rotatably connected with the casing, the first support and the second support being pivotally connected with each other; and a pressing stem, the pressing stem extending into the accommodating space to be rotatably connected with the first support and the second support and protruding from the casing through the opening, the pressing stem being movable parallel to a vertical direction relative to the casing through the first support and the second support, a motion of the pressing stem in the vertical direction having a top dead center and a bottom dead center, wherein when the pressing stem is at the top dead center and the bottom dead center, the pressing stem does not touch the casing in the vertical direction.

2. The keyswitch structure according to claim 1, wherein when the pressing stem moves vertically between the top dead center and the bottom dead center, the pressing stem is kept out of contact with the casing in a horizontal direction.

3. The keyswitch structure according to claim 1, further comprising a lateral force generating mechanism, disposed in the accommodating space, wherein the lateral force generating mechanism comprises an elastic part, the lateral force generating mechanism applies a lateral force to the first support through the elastic part, the first support and the second support are pivotally connected relative to a rotation axis, the first support has a pressing stem connecting portion and is connected to the pressing stem through the pressing stem connecting portion, wherein when the pressing stem is at the top dead center, the pressing stem connecting portion is higher than the rotation axis in the vertical direction, the lateral force produces a first moment relative to the rotation axis for the first support, and the first moment makes the first support tend to move upward, and wherein when the pressing stem is at the bottom dead center, the pressing stem connecting portion is lower than the rotation axis in the vertical direction, the lateral force produces a second moment relative to the rotation axis for the first support, and the second moment make the first support tend to move downward.

4. The keyswitch structure according to claim 3, wherein the lateral force is not parallel to the vertical direction.

5. The keyswitch structure according to claim 1, further comprising a spring, disposed in the accommodating space and abutting against and between the casing and the pressing stem in the vertical direction.

6. The keyswitch structure according to claim 1, further comprising a switch, disposed on the casing, wherein the first support or the second support comprises a triggering portion, and in a movement of the pressing stem moving from the top dead center to the bottom dead center, the triggering portion triggers the switch.

* * * * *